US009080690B2

(12) United States Patent
Gilstad et al.

(10) Patent No.: US 9,080,690 B2
(45) Date of Patent: Jul. 14, 2015

(54) TUNABLE CHECK VALVE

(71) Applicants: Dennis W. Gilstad, San Antonio, TX (US); Barbara C. Gilstad, San Antonio, TX (US)

(72) Inventors: Dennis W. Gilstad, San Antonio, TX (US); Barbara C. Gilstad, San Antonio, TX (US)

(*) Notice: Subject to any disclaimer, the term of this patent is extended or adjusted under 35 U.S.C. 154(b) by 0 days.

(21) Appl. No.: 14/524,093

(22) Filed: Oct. 27, 2014

(65) Prior Publication Data

US 2015/0040998 A1    Feb. 12, 2015

Related U.S. Application Data

(63) Continuation-in-part of application No. 14/168,147, filed on Jan. 30, 2014, now Pat. No. 8,944,409, and a continuation-in-part of application No. 14/047,046, filed on Oct. 7, 2013, now Pat. No. 8,746,654, and a (Continued)

(51) Int. Cl.
*F16K 47/02*    (2006.01)
*F04B 53/00*    (2006.01)
(Continued)

(52) U.S. Cl.
CPC .............. *F16K 47/023* (2013.01); *F04B 53/001* (2013.01); *F04B 53/10* (2013.01); *F04B 53/1087* (2013.01); *F16K 1/36* (2013.01); *F16K 15/00* (2013.01); *F16K 15/06* (2013.01); *F16K 25/005* (2013.01); *F16K 31/00* (2013.01);
(Continued)

(58) Field of Classification Search
CPC ....... F16K 47/023; F16K 15/00; F16K 15/06; F16K 31/00; F16K 25/005; F16K 47/00; F04B 53/10; F04B 53/001; F04B 53/1087; Y10T 137/785; Y10S 137/902; Y10S 137/904

USPC ......... 251/12, 48, 77, 80, 120, 318, 332, 334, 251/356–358, 366–368; 137/329.04, 137/516.29, 902, 904
See application file for complete search history.

(56) References Cited

U.S. PATENT DOCUMENTS 432,744 A    7/1890    Adams
767,118 A    8/1904    Popham et al.
(Continued)

FOREIGN PATENT DOCUMENTS

DE    20300159 U1    3/2003

OTHER PUBLICATIONS

Introduction to Impulse Hammers, Internet download Sep. 2011 from Dytran Instruments, Inc.

*Primary Examiner* — Marina Tietjen
(74) *Attorney, Agent, or Firm* — Dennis W. Gilstad

(57) ABSTRACT

Tunable check valves reduce valve-generated vibration to increase the reliability of tunable fluid ends. Selected improved designs described herein reflect disparate applications of identical technical principles (relating to, e.g., the vibration spectrum of an impulse). Tunable check valve embodiments comprise a family including, but not limited to, tunable check valve assemblies, tunable valve seats, and tunable radial arrays. Each such tunable embodiment, in turn, contributes to blocking excitation of fluid end resonances, thus reducing the likelihood of fluid end failures associated with fatigue cracking and/or corrosion fatigue. By downshifting the frequency domain of each valve-closing impulse shock, initial excitation of fluid end resonances is minimized. Subsequent damping and/or selective attenuation of vibration likely to excite one or more predetermined (and frequently localized) fluid end resonances represents further optimal use of fluid end vibration-control resources for improving high-pressure fluid end reliability.

20 Claims, 15 Drawing Sheets

Related U.S. Application Data continuation-in-part of application No. 13/711,644, filed on Dec. 12, 2012, now Pat. No. 8,567,753, and a continuation-in-part of application No. 13/296,251, filed on Nov. 15, 2011, now abandoned, and a continuation-in-part of application No. 13/228,475, filed on Sep. 9, 2011, now abandoned, and a continuation-in-part of application No. 13/228,474, filed on Sep. 9, 2011, now abandoned, and a continuation-in-part of application No. 13/210,407, filed on Aug. 16, 2011, now Pat. No. 8,292,260, and a continuation-in-part of application No. 13/196,916, filed on Aug. 3, 2011, now Pat. No. 8,267,371, and a continuation-in-part of application No. 13/616,098, filed on Sep. 14, 2012, now Pat. No. 8,403,337, and a continuation-in-part of application No. 13/525,391, filed on Jun. 18, 2012, now Pat. No. 8,292,301, and a continuation-in-part of application No. 13/456,235, filed on Apr. 26, 2012, now Pat. No. 8,276,918, and a continuation-in-part of application No. 13/184,965, filed on Jul. 18, 2011, now Pat. No. 8,210,542, and a continuation-in-part of application No. 14/038,819, filed on Sep. 27, 2013, now Pat. No. 8,708,306, and a continuation-in-part of application No. 13/525,374, filed on Jun. 18, 2012, now Pat. No. 8,550,425, and a continuation-in-part of application No. 13/228,475.

(51) Int. Cl.

| | |
|---|---|
| *F04B 53/10* | (2006.01) |
| *F16K 47/00* | (2006.01) |
| *F16K 1/36* | (2006.01) |
| *F16K 15/00* | (2006.01) |
| *F16K 15/06* | (2006.01) |
| *F16K 25/00* | (2006.01) |
| *F16K 31/00* | (2006.01) |

(52) U.S. Cl.
CPC ............ *F16K47/00* (2013.01); *Y10S 137/902* (2013.01); *Y10S 137/904* (2013.01); *Y10T 137/785* (2015.04)

(56) References Cited

U.S. PATENT DOCUMENTS

| | | |
|---|---|---|
| 829,546 A | 8/1906 | Schou |
| 1,705,800 A | 3/1929 | Akeyson |
| 1,716,896 A | 6/1929 | Miller |
| 1,733,180 A | 10/1929 | Biedermann |
| 2,002,672 A | 5/1935 | Melott |
| 2,011,547 A | 8/1935 | Campbell |
| 2,018,288 A | 10/1935 | Steirly |
| 2,178,876 A | 11/1939 | MacClatchie |
| 2,298,632 A | 10/1942 | Thorner |
| 2,329,576 A | 9/1943 | Anderson |
| 2,446,196 A | 8/1948 | Sitney |
| 2,792,016 A | 5/1957 | Shellman et al. |
| 3,004,633 A | 10/1961 | Hobson |
| 3,047,007 A | 7/1962 | Lunken |
| 3,053,500 A | 9/1962 | Atkinson |
| 3,053,501 A | 9/1962 | Varga |
| 3,054,452 A | 9/1962 | Napolitano |
| 3,172,424 A | 3/1965 | Stillwagon |
| 3,209,777 A | 10/1965 | Salisbury |
| 3,540,472 A | 11/1970 | Brady et al. |
| 3,617,589 A | 11/1971 | Jones-Hinton et al. |
| 3,827,671 A | 8/1974 | Bolden et al. |
| 3,951,849 A | 4/1976 | Vickery et al. |
| 4,088,301 A | 5/1978 | Ehmig |
| 4,103,909 A | 8/1978 | Hoffman et al. |
| 4,181,027 A | 1/1980 | Talbott, Jr. |
| 4,254,792 A | 3/1981 | Schadel |
| 4,269,419 A | 5/1981 | Brant |
| 4,300,775 A | 11/1981 | Ringel |
| 4,572,519 A | 2/1986 | Cameron et al. |
| 4,602,762 A | 7/1986 | Koch et al. |
| 4,687,421 A | 8/1987 | Cameron et al. |
| 4,759,428 A | 7/1988 | Seshimo |
| 4,763,841 A | 8/1988 | Hafner et al. |
| 4,852,533 A | 8/1989 | Doncker et al. |
| 4,860,995 A | 8/1989 | Rogers |
| 4,951,707 A | 8/1990 | Johnson |
| 5,073,096 A | 12/1991 | King et al. |
| 5,088,521 A | 2/1992 | Johnson |
| 5,091,455 A | 2/1992 | Blank et al. |
| 5,158,162 A | 10/1992 | Fink et al. |
| 5,183,863 A | 2/1993 | Nakamura et al. |
| 5,226,445 A | 7/1993 | Surjaatmadja |
| 5,238,744 A | 8/1993 | Williams et al. |
| 5,249,600 A | 10/1993 | Blume |
| 5,262,232 A | 11/1993 | Wilfong et al. |
| 5,275,204 A | 1/1994 | Rogers et al. |
| 5,370,150 A | 12/1994 | Nehm |
| 5,431,186 A | 7/1995 | Blume |
| 5,507,477 A | 4/1996 | Manning et al. |
| 5,580,068 A | 12/1996 | Gundy |
| 5,629,503 A | 5/1997 | Thomasen |
| 5,639,098 A | 6/1997 | MacDonald |
| 5,670,006 A | 9/1997 | Wilfong et al. |
| 5,799,953 A | 9/1998 | Henderson |
| 5,979,242 A | 11/1999 | Hobbs |
| 6,000,677 A | 12/1999 | Cook et al. |
| 6,026,776 A | 2/2000 | Winberg |
| 6,056,270 A | 5/2000 | Zimmerly |
| 6,290,205 B1 | 9/2001 | Haga et al. |
| 6,293,514 B1 | 9/2001 | Pechoux et al. |
| 6,331,578 B1 | 12/2001 | Turner et al. |
| 6,432,320 B1 | 8/2002 | Bonsignore et al. |
| 6,701,529 B1 | 3/2004 | Rhoades et al. |
| 6,713,438 B1 | 3/2004 | Baillargeon et al. |
| 6,959,727 B2 | 11/2005 | Krishnamoorthy et al. |
| 7,081,223 B2 | 7/2006 | Khoury |
| 7,113,876 B2 | 9/2006 | Zeng et al. |
| 7,158,162 B2 | 1/2007 | Kojima |
| 7,222,837 B1 | 5/2007 | Blume |
| 7,287,545 B2 | 10/2007 | Zelson |
| 7,429,220 B2 | 9/2008 | Kuntimaddi et al. |
| 7,513,483 B1 | 4/2009 | Blume |
| 7,513,759 B1 | 4/2009 | Blume |
| 7,591,450 B1 | 9/2009 | Blume |
| 7,608,314 B2 | 10/2009 | Plant |
| 7,794,827 B2 | 9/2010 | Palmer et al. |
| 7,847,057 B2 | 12/2010 | Muller et al. |
| 7,859,733 B2 | 12/2010 | Cannon et al. |
| 7,942,603 B2 | 5/2011 | Miller |
| 8,591,196 B2 | 11/2013 | Hardwicke |
| 2004/0105980 A1 | 6/2004 | Sudarshan et al. |
| 2004/0226616 A1 | 11/2004 | Vicars |
| 2005/0084229 A1 | 4/2005 | Babbitt et al. |
| 2005/0206096 A1 | 9/2005 | Browne et al. |
| 2007/0025811 A1 | 2/2007 | Wilhelm |
| 2007/0138423 A1 | 6/2007 | Smith |
| 2008/0135361 A1 | 6/2008 | Zhou et al. |
| 2008/0279706 A1 | 11/2008 | Gambier et al. |
| 2009/0145609 A1 | 6/2009 | Holmes et al. |
| 2009/0286910 A1 | 11/2009 | Bloomfield |
| 2010/0072413 A1 | 3/2010 | Koyomogi |
| 2010/0148452 A1 | 6/2010 | Westhoff et al. |
| 2010/0327208 A1 | 12/2010 | Doutt |
| 2011/0240064 A1 | 10/2011 | Wales et al. |
| 2011/0250084 A1 | 10/2011 | Marica |
| 2012/0035309 A1 | 2/2012 | Zhu et al. |
| 2012/0136356 A1 | 5/2012 | Doherty et al. |
| 2013/0019955 A1 | 1/2013 | Bagagli et al. |

TUNABLE CHECK VALVE

FIELD OF THE INVENTION

The invention relates generally to reciprocating pumps, and more specifically to vibration and vibration effects in such pumps.

BACKGROUND

Reciprocating high-pressure pumps (commonly called fracking, frac or well-service pumps) are often used in oil and gas fields for hydraulic fracturing of rock formations to increase hydrocarbon yields. Such pumps are typically truck-mounted for easy relocation from well-to-well. And they are usually designed in two sections: the (proximal) power section (herein "power end") and the (distal) fluid section (herein "fluid end"). Each pump fluid end comprises at least one subassembly (and commonly three or more in a single fluid end housing), with each subassembly comprising a suction valve, a discharge valve, a plunger or piston, and a portion of (or substantially the entirety of) a pump fluid end subassembly housing (shortened herein to "pump housing" or "fluid end housing" or "housing" depending on the context).

In each pump fluid end subassembly, its fluid end housing comprises a pumping chamber having fluid communication with a suction bore, a discharge bore, and a plunger/piston bore. A suction valve (i.e., a check valve) within the suction bore, together with a discharge valve (i.e., another check valve) within the discharge bore, control bulk fluid movement from suction bore to discharge bore via the pumping chamber. Note that the term "check valve" as used herein refers to a valve in which a (relatively movable) valve body can reversibly close upon a (relatively stationary) valve seat to achieve substantially unidirectional bulk fluid flow through the valve.

Pulsatile fluid flow through the pump results from periodic pressurization of the pumping chamber by a reciprocating plunger or piston within the plunger/piston bore. Suction and pressure strokes alternately produce wide pressure swings in the pumping chamber (and across the suction and discharge check valves) as the reciprocating plunger or piston is driven by the pump power end.

Such pumps are rated at peak pumped-fluid pressures in current practice up to about 22,000 psi, while simultaneously being weight-limited due to the carrying capacity of the trucks on which they are mounted. (See, e.g., U.S. Pat. No. 7,513,759 B1, incorporated by reference).

Due to high peak pumped-fluid pressures, suction check valves experience particularly wide pressure variations between a suction stroke, when the valve opens, and a pressure stroke, when the valve closes. For example, during a pressure stroke with a rod load up to 350,000 pounds, a conventionally rigid/heavy check valve body may be driven longitudinally (by pressurized fluid proximal to it) toward metal-to-metal impact on a conventional frusto-conical valve seat at closing forces of about 50,000 to over 250,000 pounds (depending on valve dimensions). Total check-valve-closure impact energy (i.e., the total kinetic energy of the moving valve body and fluid at valve seat impact) is thus converted to a short-duration high-amplitude valve-closure impulse (i.e., a mechanical shock). Repeated application of such a valve-closure shock with each pump cycle predisposes the check valve, and the fluid end housing in which it is installed, to vibration-induced (e.g., fatigue) damage. Cumulative shocks thus constitute a significant liability imposed on frac pump reliability, proportional in part to the rigidity and weight of the check valve body.

The emergence of new frac pump reliability issues (e.g., failures secondary to vibration-related fatigue cracks) has paralleled the inexorable rise of peak pumped-fluid pressures in new fracking applications. And insight into these new pump failure modes can be gained through review of earlier shock and vibration studies, data from which are cited herein. For example, a recent treatise on the subject describes a mechanical shock " . . . in terms of its inherent properties, in the time domain or in the frequency domain; and . . . in terms of the effect on structures when the shock acts as the excitation." (see p. 20.5 of *Harris' Shock and Vibration Handbook*, Sixth Edition, ed. Allan G. Piersol and Thomas L. Paez, McGraw Hill (2010), hereinafter Harris). The above time and frequency domains are mathematically represented on opposite sides of equations generally termed Fourier transforms. And estimates of a shock's structural vibration effects are frequently described in terms of two parameters: (1) the structure's undamped natural frequency and (2) the fraction of critical structural damping or, equivalently, the resonant gain Q (see Harris pp. 7.6, 14.9-14.10, 20.10). (See also, e.g., U.S. Pat. No. 7,859,733 B2, incorporated by reference).

Mathematical representations of time and frequency domain data play important roles in computer-assisted analysis of mechanical shock. In addition, shock properties are also commonly represented graphically as time domain impulse plots (e.g., acceleration vs. time) and frequency domain vibration plots (e.g., spectrum amplitude vs. frequency). Such graphical presentations readily illustrate the shock effects of metal-to-metal valve-closure, wherein longitudinal movement of a check valve body is abruptly stopped by a valve seat. Relatively high acceleration values and broad vibration spectra are prominent, each valve-closure impulse response primarily representing a violent conversion of kinetic energy to other energy forms.

Since energy cannot be destroyed, and since a conventional valve can neither store nor convert to heat (i.e., dissipate) more than a small fraction of the valve-closure impulse's kinetic energy, most of that energy is necessarily transmitted to the pump (or fluid end) housing. In a time domain plot, the transmitted energy appears as a high-amplitude impulse of short duration. And a corresponding frequency domain plot of transmitted energy reveals a broad-spectrum band of high-amplitude vibration. This means that nearly all of the check valve's cyclical valve-closure kinetic energy is converted to vibration energy. The overall effects of check valve closures may thus be compared to the mechanical shocks that would result from striking the valve seat repeatedly with a commercially-available impulse hammer, each hammer strike being followed by a rebound. Such hammers are easily configured to produce relatively broad-spectrum high-amplitude excitation (i.e., vibration) in an object struck by the hammer. (See, e.g., *Introduction to Impulse Hammers* at http://www.dytran.com/tmg/tech/a11.pdf, and Harris p. 20.10).

Summarizing then, relatively broad-spectrum high-amplitude vibration predictably results from a typical high-energy valve-closure impulse. And frac pumps with conventionally-rigid valves can suffer hundreds of these impulses per minute. Note that the number of impulses per minute (for example, 300 impulses per minute) corresponds to pump plunger strokes or cycles, and this number may be converted to impulses-per-second (i.e., $300/60=5$). The number 5 is sometimes termed a frequency because it is given the dimensions of cycles/second or Hertz (Hz). But the "frequency" thus attributed to pump cycles themselves differs from the spectrum of vibration frequencies resulting from each individual pump cycle impulse. The difference is that impulse-generated (e.g., valve-generated) vibration occurs in bursts of broad spectra which may simultaneously contain many vibration frequencies ranging from a few Hz to several thousand Hz (kHz).

Nearly all of this (generally-higher frequency) valve-generated vibration energy is quickly transmitted to proximate areas of the fluid end or pump housing, where it can be expected to excite damaging resonances that predispose the housing to fatigue failures. (See, e.g., U.S. Pat. No. 5,979, 242, incorporated by reference). If, as expected, a natural resonance frequency of the housing coincides with a frequency within the valve-closure vibration spectrum, fluid end vibration amplitude may be substantially increased and the corresponding vibration fatigue damage made much worse. (See Harris, p. 1.3).

Opportunities to limit fluid end damage begin with experiment-based redesign to control vibration fatigue. For example, a spectrum of vibration frequencies initially applied to a fluid end as a test can reveal structural resonance frequencies likely to cause trouble. Specifically, the applied vibration of a half-sine shock pulse of duration one millisecond has predominant spectral content up to about 2 kHz (see Harris, p. 11.22), likely overlapping a plurality of fluid end housing natural frequencies. Such tests particularly focus attention on blocking progression of fatigue crack growth to the critical size for catastrophic fracture. Note that stronger housings aren't necessarily better in such cases, since increasing the housing's yield strength causes a corresponding decrease in critical crack size. (See Harris, p. 33.23).

It might be assumed that certain valve redesigns proposed in the past (including relatively lighter valve bodies) would have alleviated at least some of the above failure modes. (See, e.g., U.S. Pat. No. 7,222,837 B1, incorporated by reference). But such redesigns emerged (e.g., in 2005 or earlier) when fluid end peak pressures were generally substantially lower than they currently are. In relatively lower pressure applications (e.g., mud pumps), rigid/heavy valve bodies performed well because the valve-closure shocks and associated valve-generated vibration were less severe compared to shock and vibration experienced more recently in higher pressure applications (e.g., fracking). Thus, despite their apparent functional resemblance to impulse hammers, relatively rigid/heavy valves have been pressed into service as candidates for use in frac pump fluid ends. Indeed, they have generally been the only valves available in commercial quantities during the recent explosive expansion of well-service fracking operations. Substantially increased fluid end failure rates (due, e.g., to cracks near a suction valve seat deck) have been among the unfortunate, and unintended, consequences.

Under these circumstances, it is regrettable but understandable that published data on a modern 9-ton, 3000-hp well-service pump includes a warranty period measured in hours, with no warranty for valves or weld-repaired fluid ends.

Such baleful vibration-related results in fluid ends might usefully be compared with vibration-related problems seen during the transition from slow-turning two-cylinder automobile engines to higher-speed and higher-powered inline six-cylinder engines around the years 1903-1910. Important torsional-vibration failure modes suddenly became evident in new six-cylinder engines, though they were neither anticipated nor understood at the time. Whereas the earlier engines had been under-powered but relatively reliable, torsional crankshaft vibrations in the six-cylinder engines caused objectionable noise ("octaves of chatter from the quivering crankshaft") and unexpected catastrophic failures (e.g., broken crankshafts). (Quotation cited on p. 13 of *Royce and the Vibration Damper*, Rolls-Royce Heritage Trust, 2003). Torsional-vibration was identified as the culprit and, though never entirely eliminated, was finally reduced to a relatively minor maintenance issue after several crankshaft redesigns and the development of crankshaft vibration dampers pioneered by Royce and Lanchester.

Reducing the current fluid end failure rates related to valve-generated vibration in frac pumps requires an analogous modern program of intensive study and specific design changes. The problem will be persistent because repeatedly-applied valve-closure energy impulses cannot be entirely eliminated in check-valve-based fluid end technology. So the valve-closing impulses must be modified, and their associated vibrations damped, to reduce excitation of destructive resonances in valves, pump housings, and related fluid end structures. Alternate materials, applied via innovative designs, illuminate the path forward now as they have in the past. Broad application of such improvements promises higher frac pump reliability, an important near-term goal. Simultaneously, inhibition of corrosion fatigue throughout analogous fluid circuits would be advanced, a longer-term benefit in refineries, hydrocarbon crackers and other industrial venues that are also subjected to shock-related vibration.

SUMMARY OF THE INVENTION

Tunable check valves reduce valve-generated vibration to increase the reliability of tunable fluid ends. Selected improved designs described herein reflect disparate applications of identical technical principles (relating to, e.g., the vibration spectrum of an impulse). Tunable check valve embodiments comprise a family including, but not limited to, tunable check valve assemblies, tunable valve seats, and tunable radial arrays. Each such tunable embodiment, in turn, contributes to blocking excitation of fluid end resonances, thus reducing the likelihood of fluid end failures associated with fatigue cracking and/or corrosion fatigue. By down-shifting the frequency domain of each valve-closing impulse shock, initial excitation of fluid end resonances is minimized. Subsequent damping and/or selective attenuation of vibration likely to excite one or more predetermined (and frequently localized) fluid end resonances represents further optimal use of fluid end vibration-control resources for improving high-pressure fluid end reliability.

Frequency domain down-shifting and damping both assist vibration control by converting valve-closure energy to heat and dissipating it in each tunable component present in a tunable fluid end embodiment. Effects of down-shifting on a valve-closure impulse shock include frequency-selective spectrum-narrowing that is easily seen in the frequency domain plot of each shock. That is, down-shifting effectively attenuates and/or limits the bandwidth(s) of valve-generated vibration. Subsequent (coordinated) damping assists in converting a portion of this band-limited vibration to heat.

Both down-shifting and damping are dependent in part on constraints causing shear-stress alteration (that is, "tuning") imposed on one or more viscoelastic and/or shear-thickening elements in each tunable component. Additionally, hysteresis or internal friction (see Harris, p. 5.7) associated with mechanical compliance of certain structures (e.g., valve bodies or springs) may aid damping by converting vibration energy to heat (i.e., hysteresis loss). (See Harris, p. 2.18).

Tunable component resonant frequencies may be shifted (or tuned) in a coordinated manner to approximate predetermined values corresponding to measured or estimated pump or fluid-end resonant frequencies (termed herein critical frequencies). Such coordinated tuning predisposes valve-generated vibration at critical frequencies to excite the tunable component (and thus be damped and dissipated as heat) rather than exciting the fluid end (e.g., the fluid end housing) itself. This reduces the likelihood of fluid end failures due, e.g., to vibration-induced fatigue cracks.

To complement the above coordinated damping, frequency down-shifting functions to reduce the total amount of vibration near critical frequencies requiring damping. Such down-shifting is activated through designs enhancing mechanical compliance. In continuous pump operation, mechanical compliance is manifest, for example, in elastic valve body flexures secondary to repetitive longitudinal compressive forces (secondary to, e.g., plunger pressure strokes) on the valve body against the valve seat. Each such flexure is followed by a hysteresis-limited elastic rebound of the valve body from the valve seat. The duration of the entire flexure-rebound interval (i.e., a cycle) is termed herein rebound cycle time and is measured in seconds. The inverse of rebound cycle time has the dimensions of frequency and is termed herein rebound characteristic frequency. Cumulative rebound cycle energy loss in the form of heat (e.g., hysteresis loss plus friction loss) is continuously transported for redistribution within the valve body and eventual rejection to the valve body surroundings (including, e.g., the pumped fluid). This heat loss represents a reduction in the total available energy content (and thus the damage-causing potential) of the valve-closure energy impulse.

Note that lengthening rebound cycle time to beneficially narrow the valve-generated vibration spectrum is accomplished in various invention embodiments using mechanical/hydraulic/pneumatic analogs of electronic wave-shaping techniques. For example, lengthened rebound cycle time is substantially influenced by the tunable valve assembly's increased longitudinal compliance associated with circular rolling contact seal (i.e., comprising valve body flexure and rebound) described herein, e.g., as between a tunable check valve body's peripheral valve seat interface and a tunable valve seat's mating surface.

Briefly summarizing, as each tunable component present in a tunable fluid end embodiment absorbs, converts and redistributes (i.e., dissipates) a portion of valve closing impulse shock energy, only a fraction of the original closing impulse energy remains at critical frequencies capable of exciting destructive resonant frequencies in the fluid end. Following vibration down-shifting, a significant portion of valve-closure energy has been shifted to lower frequency vibration through structural compliance as described above. This attenuated vibration is then selectively damped (i.e., dissipated as heat) at shifted frequencies via one or more of the tunable components. While tunable components may be relatively sharply tuned (e.g., to act as tuned mass dampers for a relatively narrowed range of frequencies), they may alternately be more broadly tuned to account for a relatively broad range of vibration frequencies encountered in certain pump operations. Flexibility in tuning procedures, as described herein with material and adjustment choices, is therefore frequently desirable.

Note that vibration absorption at a relatively narrow range of frequencies (e.g., via dynamic or tuned absorbers) may have limited utility in conventional frac pumps because of the varying speeds at which the pumps operate and the relatively broad vibration bandwidths associated with valve-closing impulse shocks. In contrast, the process of down-shifting followed by damping in tunable fluid ends is more easily adapted to changes inherent in the pumps' operational environment. Damping may nevertheless be added to a dynamic absorber to increase its effective frequency range for certain applications. (See, e.g., *tuned vibration absorber* and *tuned mass damper* in ch. 6 of Harris).

Selective damping of vibration frequencies near the (critical) resonant frequencies of fluid ends is desirable for the same reason that soldiers break step when they march over a bridge—because even relatively small amounts of vibration energy applied near the bridge's critical resonant frequencies can cause catastrophic failure. Similar reasoning underlies the functions of selective vibration down-shifting and damping in tunable fluid ends. Various combinations of the tunable components described herein are particularly beneficial because they focus the functions of vibration-limiting resources on minimization of vibration energy present in a fluid end near its critical frequencies. Cost and complexity of tunable components are thus minimized while the efficacy of each tunable component's function (i.e., vibration limitation near particular frequencies) is enhanced. Stated another way, a tunable component's selective vibration down-shifting and damping are optimized using metrics including cost, complexity, and damping factor (or degree of damping).

Note that a variety of optimization strategies for vibration attenuation and damping may be employed in specific cases, depending on parameters such as the Q (or quality) factor attributable to each fluid end resonance. The fluid end response to excitation of a resonance may be represented graphically as, for example, a plot of amplitude vs. frequency. Such a Q response plot typically exhibits a rounded-peak amplitude, with decreasing amplitude values at frequencies above and below an indicated resonance frequency (corresponding to the frequency observed at the center of the rounded-peak amplitude curve). At an amplitude value about 0.707 times the rounded-peak value (i.e., the half-power point), the amplitude plot corresponds not to a single frequency, but to a bandwidth between upper and lower frequency values corresponding to the width of the Q response plot at that amplitude. The quality factor Q is then estimated as the ratio of the indicated resonance frequency to the bandwidth. (See, e.g., pp. 2-18, 2-19 of Harris). (See also U.S. Pat. No. 7,113,876 B2, incorporated by reference).

Lower Q connotes the presence of more damping and a wider bandwidth (i.e., a relatively broader band of near-resonant frequencies). And higher Q connotes less damping and a narrower bandwidth (ideally, zero damping and a single resonant frequency). Since ideal fluid end resonances, and hence single resonant frequencies, are not encountered in practice, optimization strategies typically refer to a range of frequencies. Specification of a frequency range of interest may include, for example, choice of an indicated resonant frequency (corresponding to a peak of the Q response curve), together with the Q of the tunable component. The latter may be estimated in light of the peak resonant frequency and Q of the fluid end resonance of interest. Tunable component resonant frequencies identified herein as "similar" to fluid end or pump housing resonances are thus understood to lie within the frequency range indicated by the upper and lower frequency values of the relevant Q response half-power bandwidth.

In tunable components of the invention, choice of Q depends on both materials and structure, especially structural compliances and the properties of viscoelastic and/or shear-thickening materials present in the component(s). Further, the peak (or representative) frequency of a tunable component or a fluid end resonance may not be unambiguously obtainable. Thus, optimization of tunable component vibration damping may be an iterative empirical process and may not be characterized by a single-valued solution. Analogously, optimization may require tuning a component or fluid end resonance to a frequency less than, similar to, or greater than a reference frequency (e.g., a fluid end resonance frequency). Note also that tunable-component resonant frequencies may be intentionally "detuned" (i.e., adjusted to slightly different values from nominal resonant or peak frequencies) in pursuit of an overall optimization strategy.

To reduce the likelihood of fluid-end fatigue crack failures then, resonant frequencies of each tunable component of the invention are adjusted (i.e., tuned) using analytical and/or empirical frequency measures. Such measures are considered in light of the resonant frequencies of any other tunable component(s) present, and also in light of critical frequencies of the fluid end and/or other portions of the pump itself. The objective is optimal attenuation and damping of the most destructive portion(s) of valve-generated vibration. In each case, optimal vibration limitation will be dependent on the component's capacity to dissipate heat generated through hysteresis, friction and/or fluid turbulence. Thus, certain predetermined portion(s) of valve-closure energy are dissipated at one or more predetermined pump housing resonant (critical) frequencies.

Note that the critical frequencies proximate to a fluid end suction bore may differ, for example, from the critical frequencies proximate to the same fluid end's plunger bore due to the different constraints imposed by structures proximate the respective bores. Such differences are accounted for in the adjustment of tunable components, particularly tunable valve seats and tunable plunger seals.

What follows are descriptions of the structure and function of illustrative examples of tunable components, subassemblies, assemblies, and subsystems (including, e.g., tunable fluid end embodiments). Criteria for tuning typically include reference to one or more resonant frequencies of associated structures. A tunable fluid end embodiment, for example, comprises at least one subassembly, and each subassembly comprises a housing (e.g., a fluid end housing or pump housing with suction, discharge and plunger bores). Within bores are, respectively, a suction valve, a discharge valve, and a plunger or piston. When a tunable fluid end comprises multiple subassemblies (which is the general case), the respective subassembly housings are typically combined in a single fluid end housing. And at least one subassembly of a tunable fluid end has at least one tunable component. In specific tunable fluid end embodiments, tunable components may be employed singly or in various combinations, depending on operative requirements.

In an example embodiment of a tunable check valve in a fluid end for high pressure pumping, the fluid end has at least one fluid-end resonant frequency. The tunable check valve is symmetrical about a longitudinal axis and comprises a tunable check valve assembly and a tunable valve seat. The tunable check valve assembly comprises a valve body having a peripheral valve seat interface, and further comprises a resilient seal in a peripheral groove, the tunable check valve assembly having a first plurality of tunable vibration dampers. The tunable valve seat comprises a concave mating surface spaced longitudinally apart from a lateral support assembly, the tunable valve seat having a second plurality of tunable vibration dampers. The first plurality of tunable vibration dampers comprises a circular tubular area in said resilient seal, and further comprises a central fluid flow restrictor in fluid communication with a circular tubular area. The second plurality of tunable vibration dampers comprises a plurality of circular viscoelastic support elements longitudinally spaced along said lateral support assembly, each said circular viscoelastic support element comprising a circular tubular area. And the peripheral valve seat interface has a convex curvature with correspondingly greater curvature than said concave mating surface for achieving a circular rolling contact seal between said tunable check valve assembly and said tunable valve seat, said circular rolling contact seal having a rebound characteristic frequency similar to at least one said fluid-end resonant frequency.

In an alternate example embodiment of a tunable check valve in a fluid end for high pressure pumping, the fluid end again has at least one fluid-end resonant frequency. The tunable check valve is symmetrical about a longitudinal axis and comprises a tunable check valve assembly and a tunable valve seat. The tunable check valve assembly comprises a valve body having a resilient seal in a peripheral seal retention groove, said resilient seal comprising a first circular tubular area, and said first circular tubular area having a wedge-shape in longitudinal cross-section. The first circular tubular area has a relatively medial boundary and a relatively lateral boundary. The wedge-shape tapers monotonically in thickness from a relatively thicker portion adjacent to said relatively lateral boundary to a relatively thinner portion adjacent to said relatively medial boundary. The valve body comprises a peripheral valve seat interface having a convex curvature and said tunable valve seat has a concave mating surface with correspondingly less curvature than said peripheral valve seat interface for achieving a circular rolling contact seal with said valve seat interface. And the valve body closes on the tunable valve seat with a rebound characteristic frequency lower than at least one said fluid-end resonant frequency.

In yet another alternate example embodiment of a tunable check valve in a fluid end for high pressure pumping, the fluid end has at least one fluid-end resonant frequency. The tunable check valve is symmetrical about a longitudinal axis and comprises a tunable check valve assembly and a tunable valve seat, said tunable valve seat comprising a lateral support assembly spaced longitudinally apart from a mating surface with concave curvature. The tunable check valve assembly comprises a valve body having a peripheral valve seat interface and further having a resilient seal in a peripheral groove, said resilient seal comprising a circular tubular area. The peripheral valve seat interface has convex curvature, said convex curvature being correspondingly greater than said mating surface concave curvature for achieving a circular rolling contact seal between said tunable check valve assembly and said tunable valve seat. The circular rolling contact seal between said tunable check valve assembly and said tunable valve seat has a rebound characteristic frequency greater than at least one said fluid-end resonant frequency. The valve body comprises a circular tubular area in fluid communication with a fluid flow restrictor, said fluid flow restrictor being responsive to cyclical longitudinal compression of said valve body. The lateral support assembly comprises a plurality of circular viscoelastic support elements, each element comprising a support circumferential tubular area. And the circular tubular area and each support circumferential tubular area contains at least one fluid tuning medium.

In greater detail, a tunable check valve assembly (which may constitute a portion of a tunable check valve) is installed in a fluid end for high pressure pumping, the fluid end having at least one fluid-end resonant frequency. Such a tunable check valve assembly is symmetrical about a longitudinal axis and comprises a plurality of radially-spaced vibration dampers in a valve body having a peripheral seal. Each vibration damper comprises at least one tunable structural feature (e.g., a circular tubular area). And each tunable structural feature in the form of a circular tubular area is tunable (and thus the vibration damper of which it is a part is tunable) via a fluid tuning medium within each tubular area to a damping frequency similar to at least one fluid end resonant frequency.

The fluid tuning medium may contain, e.g., a shear-thickening fluid, and it may be augmented by addition of nanoparticles to improve e.g., heat scavenging.

In the above example assembly, the peripheral seal may comprise a vibration damper (i.e., a peripheral vibration damper). The seal may also comprise a medial flange sized to closely fit within a flange channel of the valve body, with the medial flange partially surrounding a peripheral circular tubular area within the seal which is responsive to cyclical longitudinal compression of said assembly. A fluid tuning medium in the peripheral circular tubular area facilitates tuning the peripheral vibration damper to at least one predetermined frequency. And a shear-thickening fluid within the peripheral circular tubular area will tend to tend to stiffen the peripheral seal under the shock of valve closure in the portion partially surrounded by the medial flange. Such stiffening will tend to resist the well-known tendency of peripheral seals to rotate (and thus to become partially inoperative) under the stress of valve closure.

Further in the above assembly, the valve body may comprise a central vibration damper having a central circular tubular area which is responsive to cyclical longitudinal compression of the assembly, the central circular tubular area being fillable with a fluid tuning medium (containing, for example, one or more shear-thickening fluids). Further in the above assembly, the central vibration damper may comprise at least one flow restrictor effective to limit fluid flow to and from the central circular tubular area, the flow restrictor being responsive to cyclical longitudinal compression of the assembly and thus assisting tuning of the central vibration damper to a predetermined damping frequency similar to at least one fluid end resonant frequency.

Since the fluid end has at least a first fluid-end resonance frequency, at least one vibration damper of the assembly has (i.e., is tuned to) at least a first predetermined assembly resonant frequency similar to the first fluid-end resonance (i.e., resonant frequency). If, for example, the fluid end has a second fluid end resonance frequency (a common occurrence), a single assembly vibration damper and/or at least one of a plurality of assembly vibration dampers may have (i.e., be tuned to) at least a second predetermined assembly resonant frequency similar to the second fluid end resonance frequency. In general, the specific manner of damping either one or a plurality of fluid-end resonance frequencies with either one or a plurality (but not necessarily the same number) of vibration dampers is determined during the optimization process noted above.

In general, sample embodiments of tunable check valve assemblies schematically illustrated herein comprise a check valve body having guide means (and/or analogous means such as a functional shape to maintain valve body alignment during longitudinal movement) and a peripheral valve seat interface. Note, however, that desired valve body alignment may be maintained by means external to the check valve. A peripheral groove spaced radially apart from a central reservoir is present in certain embodiments, and a viscoelastic element may be present in the peripheral groove (i.e., the groove damping element). In one such embodiment, the assembly's vibration dampers comprise a plurality of radially-spaced viscoelastic body elements disposed in the groove and reservoir, the viscoelastic groove element comprising a groove circular tubular area. In alternative embodiments, the viscoelastic reservoir (or central) damping element may be replaced by a central spring-mass damper. A viscoelastic central damper may be tuned, for example, via a flange centrally coupled to the valve body. A spring-mass central damper may be tuned, for example, by adjusting spring constant(s) and/or mass(es), and may also or additionally be tuned via the presence of a fluid tuning medium (e.g., a viscous or shear-thickening fluid) in contact with one or more damper elements.

A reservoir (or central) damping element tuning frequency may be, as noted above, a first predetermined assembly resonant frequency similar to a first fluid end resonance. Analogously, the groove circular tubular area may comprise at least one shear thickening material providing the means to tune the groove damping element to at least a second predetermined assembly resonant frequency similar, for example, to either a first or second fluid-end resonant frequency. The choice of tuning frequencies for the reservoir and groove damping elements is not fixed, but is based on a chosen optimization strategy for vibration damping in each fluid end.

Note that phase shifts inherent in the (nonlinear) operation of certain vibration dampers described herein create the potential for a plurality of resonant frequencies in a single vibration damper.

Note also that the longitudinal compliance of a tunable check valve assembly affects its rebound cycle time and thus influences vibration attenuation (i.e., downshifting or spectrum narrowing), which constitutes a form of tuning. Further, vibration dampers in alternative tunable check valve assembly embodiments may comprise spring-mass combinations having discrete mechanical components in addition to, or in place of, viscoelastic and/or shear-thickening components. An example of such a spring-mass combination within a valve body central reservoir is schematically illustrated herein.

Another invention embodiment is a tunable check valve that comprises a valve seat and a valve body which is reversibly and longitudinally closeable upon the valve seat. The valve body and the valve seat have substantially collinear longitudinal axes, and the valve body comprises a seal in a peripheral seal retention groove, a peripheral valve seat interface, and a central cavity. The central cavity substantially encloses a nonlinear spring-mass damper, and the damper has a damped resonant frequency similar to a predetermined fluid-end resonant frequency. The valve body rebounds after closing on said valve seat with a rebound characteristic frequency lower than the fluid-end resonant frequency.

In the above tunable check valve embodiment, the nonlinear spring-mass damper is immersed in a fluid tuning medium (e.g., a shear-thickening—sometimes termed dilatant—fluid) within said central cavity. The nonlinear spring-mass damper comprises at least one perforated mass and at least two Belleville springs, and at least one perforated mass comprises a composite of elastic and viscoelastic components. Shearing movement (e.g., between the Belleville springs as they are cyclically compressed and relaxed) acts through friction and/or fluid turbulence in the dilatant fluid to convert kinetic energy to heat energy for subsequent rejection (e.g., to the pumped fluid). Such rejected energy is then not available for exciting damaging resonances in the fluid end.

Analogous heat energy rejection in the above check valve embodiment may take place in the seal, which comprises a circular tubular area responsive to cyclical longitudinal compression of the valve body. As schematically illustrated herein, such a circular tubular area may contain a fluid tuning medium (e.g., one or more shear-thickening fluids) for further tuning the check valve to a predetermined frequency (e.g., similar to the first fluid-end resonant frequency).

One of the tunable components described herein, a tunable valve seat, may be employed in certain embodiments with a conventional valve body. Alternatively, it may be combined with a tunable check valve assembly to form a tunable check valve. In practice, a tunable valve seat is installed in a fluid end for high pressure pumping, the fluid end having at least a first fluid-end resonant frequency. An illustrative example of a tunable valve seat comprises a curved mating surface spaced longitudinally apart from a tapered mounting surface.

The valve seat mating surface is curved (e.g., concave) for achieving a circular rolling contact seal that provides decreased contact area, along a circular line, with a valve seat interface having correspondingly greater curvature (see related description herein regarding decreased contact area). Instead of the above-mentioned tapered mounting surface, a lateral support assembly may be employed to provide coupling for the valve seat to a pump or fluid end housing.

A lateral support assembly is a tunable structural feature for resiliently coupling the tunable valve seat to a fluid end housing (and thus damping vibrations therein). That is, a lateral support assembly (and thus a tunable valve seat of which it is a part) has at least one tunable valve seat resonant frequency similar to at least one fluid-end resonant frequency. Further, a lateral support assembly may be combined with a concave mating surface to provide two tunable structural features in a single tunable valve seat. Tunability of the concave mating surface inheres in its influence on rebound cycle time through the predetermined orientation and degree of curvature of the concave mating surface. Since it constitutes a tunable structural feature, a concave mating surface may be present in a tunable valve seat without a lateral support assembly. In the latter case, the concave mating surface will be longitudinally spaced apart from a tapered mounting surface, rather than a lateral support mounting surface (examples of these two surfaces are schematically illustrated herein). In light of a tunable valve seat's potential for embodying either one or two tunable structural features, a plurality of tunable valve seat resonant frequencies may characterize a single tunable valve seat, with the respective frequencies being chosen in light of the fluid end resonance(s) and the valve closure impulse vibration spectrum.

Flexibility in the choice of tunable seat resonant frequencies is guided by optimization criteria for vibration control in a tunable fluid end. Such criteria will suggest specifics of a lateral support assembly's structure and/or the concave curvature of a mating surface. For example, a lateral support assembly's one or more suitably-secured circular viscoelastic support elements comprise a highly adaptable support assembly design for resiliently coupling the tunable valve seat to a fluid end housing (and thus damping vibrations therein). At least one such viscoelastic support element comprises a support circular tubular area. And each support circular tubular area, in turn, comprises at least one shear-thickening material having (i.e., being tuned to a resonance frequency similar to) at least one resonant frequency that may be chosen to be similar to at least one fluid-end resonant frequency. The shear thickening material may additionally comprise nanoparticles to facilitate, e.g., heat energy dissipation). As above, the choice of tuning frequency or frequencies for a tunable valve seat is not fixed, but is based on a predetermined optimization strategy for vibration damping in each fluid end.

Note that in addition to individual tuning of a tunable check valve assembly and a tunable valve seat (forming a tunable check valve), the combination may be tuned as a whole. For example, a tunable check valve in a fluid end for high pressure pumping may alternatively or additionally be tuned for spectrum narrowing by ensuring that its rebound characteristic frequency (i.e., a function of rebound cycle time) is less than, similar to, or greater than at least one fluid-end resonant frequency.

Note that a tunable fluid end may comprise the tunable check valve as a single tunable component, or in combination with one or more additional tunable components.

Alternate tunable components described herein include a tunable radial array disposed in a valve body. In a schematically illustrated embodiment, the valve body comprises guide means, a peripheral valve seat interface, and a fenestrated peripheral groove spaced radially apart from a central reservoir. A viscoelastic body element disposed in the groove (the groove element) is coupled to a viscoelastic body element disposed in the reservoir (the reservoir element) by a plurality of viscoelastic radial tension members passing through a plurality of fenestrations in the peripheral groove. Each radial tension member comprises at least one polymer composite and functions to couple the groove element with the reservoir element, a baseline level of radial tension typically arising due to shrinkage of the viscoelastic elements during curing. The tensioned radial members, as schematically illustrated herein, assist anchoring of the coupled groove element firmly within the peripheral seal-retention groove without the use of adhesives and/or serrations as have been commonly used in anchoring conventional valve seals. Radial tension members also create a damped resilient linkage of groove element to reservoir element (analogous in function to a spring-mass damper linkage). This damped linkage can be "tuned" to approximate (i.e., have a resonance similar to) one or more critical frequencies via choice of the viscoelastic and/or composite materials in the damped linkage. Note that radial tension members also furnish a transverse preload force on the valve body, thereby altering longitudinal compliance, rebound cycle time (and thus rebound characteristic frequency), and vibration attenuation.

Another alternate tunable component described herein is a tunable plunger seal comprising at least one lateral support assembly (analogous to that of a tunable valve seat) securably and sealingly positionable along a plunger. Typically, a lateral support assembly will be installed in a packing box (sometimes termed a stuffing box) or analogous structure. The tunable plunger seal's lateral support assembly is analogous in structure and function to that of a tunable valve seat, as are the tuning procedures described above.

Note that the predetermined resonant frequency of each circular viscoelastic element of a lateral support assembly is affected by the viscoelastic material(s) comprising it, as well as by constraints imposed via adjacent structures (e.g., portions of a valve seat, fluid end housing, packing box or plunger). The choice of a variety of viscoelastic element inclusions includes, for example, reinforcing fibers, circular and/or central cavities within the viscoelastic element, and distributions of special-purpose materials (e.g., shear-thickening materials and/or graphene) within or in association with one or more viscoelastic elements.

Note also that the lateral support assembly of either a tunable valve seat or a tunable plunger seal resiliently links the respective valve seat or plunger with adjacent portions of a fluid end housing, effectively creating a spring-mass damper coupled to the housing. This damped linkage can be "tuned" to approximate one or more critical frequencies via, e.g., shear-thickening materials in the respective circular tubular areas as described herein.

Analogous damped linkages between the housing and one or more auxiliary masses may be incorporated in tunable fluid end embodiments for supplemental vibration damping at one or more fluid end resonant frequencies (e.g., auxiliary tuned vibration absorbers and/or tuned-mass dampers). Additionally or alternatively, one or more damping surface layers (applied, e.g., as metallic, ceramic and/or metallic/ceramic coatings) may be employed for dissipating vibration and/or for modifying one or more fluid end resonant frequencies in pursuit of an overall optimization plan for fluid end vibration control. Such damping surface layers may be applied to fluid ends by various methods known to those skilled in the art. These methods may include, for example, cathodic arc, pulsed electron beam physical vapor deposition (EB-PVD), slurry deposition, electrolytic deposition, sol-gel deposition, spinning, thermal spray deposition such as high velocity oxy-fuel (HVOF), vacuum plasma spray (VPS) and air plasma spray (APS). The surface layers may be applied to the desired fluid end surfaces in their entirety or applied only to specified areas. Each surface layer may comprise a plurality of sublayers, at least one of which may comprise, for example, titanium, nickel, cobalt, iron, chromium, silicon, germanium, platinum, palladium and/or ruthenium. An additional sublayer may comprise, for example, aluminum, titanium, nickel, chromium, iron, platinum, palladium and/or ruthenium. One or more sublayers may also comprise, for example, metal oxide (e.g., zirconium oxide and/or aluminum oxide) and/or a nickel-based, cobalt-based or iron-based superalloy. (See e.g., U.S. Pat. No. 8,591,196 B2, incorporated by reference).

Further as noted above, constraints on viscoelastic elements due to adjacent structures can function as a control mechanism by altering tunable component resonant frequencies. Examples of such effects are seen in embodiments comprising an adjustable flange coupled to the valve body for imposing a predetermined shear preload by further constraining a viscoelastic element already partially constrained in the reservoir. One or more tunable check valve assembly resonant frequencies may thus be predictably altered. Consequently, the associated valve-generated vibration spectrum transmissible to a housing may be narrowed, and its amplitude reduced, through hysteresis loss of valve-closure impulse energy at each predetermined assembly resonant frequency (e.g., by conversion of valve-closure impulse energy to heat energy, rather than vibration energy).

In addition to composite viscoelastic element inclusions, control mechanisms for alteration of tunable component resonant frequencies further include the number, size and spacing of peripheral groove fenestrations. When fenestrations are present, they increase valve assembly responsiveness to cyclical longitudinal compressive force while stabilizing viscoelastic and/or composite peripheral groove elements. Such responsiveness includes, but is not limited to, variations in the width of the peripheral groove which facilitate "tuning" of the groove together with its viscoelastic element(s).

Briefly summarizing, each embodiment of a tunable component attenuates and/or damps valve-generated vibration at one or more fluid end critical frequencies. The transmitted vibration spectrum is thus narrowed and its amplitude reduced through conversion and dissipation of valve-closure impulse (kinetic) energy as heat. One or more tunable component structural features are thus tunable to one or more frequencies similar to at least one fluid end resonant frequency to facilitate redistribution/dissipation of impulse kinetic energy, following its conversion to heat energy.

Continuing in greater detail, valve-closure impulse energy conversion in a tunable component primarily arises from hysteresis loss (e.g., heat loss) in viscoelastic and/or discrete-mechanical elements, but may also occur in related structures (e.g., in the valve body itself). Hysteresis loss in a particular structural feature is related in-part to that feature's compliance (i.e., the feature's structural distortion as a function of applied force).

Compliance arises in structural features of a tunable component, such as one or more viscoelastic elements, plus at least one other compliant portion. For example, a tunable check valve body distorts substantially elastically under the influence of a closing energy impulse, and its associated viscoelastic element(s) simultaneously experience(s) shear stress in accommodating the distortion. The resulting viscoelastic shear strain, however, is at least partially time-delayed. And the time delay introduces a phase-shift useful in damping valve-generated vibration (i.e., reducing its amplitude). Analogous time-delay phase shift occurs in a mass-spring damper comprising discrete mechanical elements.

In addition to vibration damping, a complementary function of a tunable component is narrowing of the spectrum of valve-generated vibration. Spectrum narrowing (or vibration down-shifting) is associated with compliance in the form of deformation over time in response to an applied force. Since each instance of compliance takes place over a finite time interval, the duration of a closing energy impulse is effectively increased (and the vibration spectrum correspondingly narrowed) as a function of compliance.

A narrowed valve-generated vibration spectrum, in turn, is less likely to generate destructive sympathetic vibration in adjacent regions of a fluid end housing. For this reason, compliant portions of a valve body are designed to elastically distort under the influence of the closing energy impulse (in contrast to earlier substantially-rigid valve designs). Compliance-related distortions are prominent in, but not limited to, the shapes of both the (peripheral) groove and the (relatively central) reservoir. Viscoelastic elements in the groove and reservoir resist (and therefore slow) the distortions, thus tending to beneficially increase the closing energy impulse's duration while narrowing the corresponding vibration spectrum.

Distortions of both groove and reservoir viscoelastic body elements result in viscoelastic stress and its associated time-dependent strain. But the mechanisms differ in the underlying distortions. In a peripheral groove, for example, proximal and distal groove walls respond differently to longitudinal compressive force on the tunable check valve assembly. They generally move out-of-phase longitudinally, thereby imposing time-varying compressive loads on the groove viscoelastic element. Thus the shape of the groove (and the overall compliance of the groove and its viscoelastic element) changes with time, making the groove as a whole responsive to cyclical longitudinal force on the assembly.

Peripheral groove fenestrations increase groove responsiveness to cyclical longitudinal force. As schematically illustrated herein, fenestrations increase groove responsiveness by changing the coupling of the proximal groove wall to the remainder of the valve body (see Detailed Description herein).

In the reservoir, in contrast, responsiveness to cyclical longitudinal force may be modulated by an adjustable preload flange centrally coupled to the valve body. The flange imposes a shear preload on the viscoelastic reservoir element (i.e., shear in addition to that imposed by the reservoir itself and/or by the closing energy impulse acting on the viscoelastic element via the pumped fluid). The amount of shear preload varies with the (adjustable) radial and longitudinal positions of the flange within the reservoir. The overall compliance and resonances of the reservoir and its viscoelastic element may be predictably altered by such a shear preload, which is imposed by the flange's partial constraint of the viscoelastic reservoir element. Note that when reservoir and groove viscoelastic body elements are coupled by a plurality of radial tension members, as in a tunable radial array, the radial tension members lying in groove wall fenestrations allow transmission of shear stress between the groove and reservoir viscoelastic elements.

Thus, in tunable radial array embodiments, at least a first predetermined resonant frequency may substantially replicate a (similar) pump housing resonant frequency via adjustment of shear preload on the reservoir viscoelastic element. The plurality of fenestration elements coupling the reservoir element with the groove element may have at least a second predetermined resonant frequency related to the first predetermined resonant frequency and optionally achieved through choice of tensile strength of the radial tension members (i.e., fenestration elements). And at least a third predetermined resonant frequency related to the first and second predetermined resonant frequencies may be achieved through choice of at least one shear thickening material in circular tubular areas of the groove viscoelastic element and/or one or more support circular tubular areas.

Note that any structural feature of a tunable check valve assembly or tunable radial array (e.g., a valve body or a viscoelastic element) may be supplemented with one or more reinforcement components to form a composite feature. Reinforcement materials tend to alter compliance and may comprise, for example, a flexible fibrous material (e.g., carbon nanotubes, graphene), a shear-thickening material, and/ or other materials as described herein.

As noted above, alterations in compliance (with its associated hysteresis loss) contribute to predetermined vibration spectrum narrowing. Such compliance changes (i.e., changes in displacement as a function of force) may be achieved through adjustment of constraint. Constraint, in turn, may be achieved, e.g., via compression applied substantially longitudinally by the adjustable preload flange to a constrained area of the viscoelastic reservoir element. In embodiments comprising a central longitudinal guide stem, the constrained area may be annular. And adjacent to such an annular constrained area may be another annular area of the viscoelastic reservoir element which is not in contact with the adjustable preload flange (i.e., an annular unconstrained area). This annular unconstrained area is typically open to pumped fluid pressure.

Preload flange adjustment may change the longitudinal compliance of the tunable check valve assembly by changing the effective flange radius and/or the longitudinal position of the flange as it constrains the viscoelastic reservoir element. Effective flange radius will generally exceed actual flange radius due to slowing of (viscous) viscoelastic flow near the flange edge. This allows tuning of the check valve assembly to a first predetermined assembly resonant frequency for maximizing hysteresis loss. Stated another way, by constraining a vibrating structure (e.g., an area of the viscoelastic reservoir element), it is possible to force the vibrational energy into different modes and/or frequencies. See, e.g., U.S. Pat. No. 4,181,027, incorporated by reference.

The family of tunable components thus includes means for constraining one or more separate viscoelastic elements of a valve assembly, as well as means for constraining a plurality of areas of a single viscoelastic element. And such constraint may be substantially constant or time-varying, with correspondingly different effects on resonant frequencies. Peripherally, time-varying viscoelastic element constraint may be provided by out-of-phase longitudinal movement of peripheral groove walls. In contrast, time-varying viscoelastic element constraint may be applied centrally by a flange coupled to the valve body.

Flange radial adjustment is facilitated, e.g., via a choice among effective flange radii and/or flange periphery configurations (e.g., cylindrical or non-cylindrical). Flange longitudinal movement may be adjusted, for example, by (1) use of mechanical screws or springs, (2) actuation via pneumatic, hydraulic or electrostrictive transducers, or (3) heat-mediated expansion or contraction. Flange longitudinal movement may thus be designed to be responsive to operational pump parameters such as temperature, acceleration, or pressure. Since pump housing resonant frequencies may also respond to such parameters, tunable check valve assemblies and tunable check valves may be made at least partially self-adjusting (i.e., operationally adaptive or auto-adjusting) so as to change their energy-absorbing and spectrum-narrowing characteristics to optimally extend pump service life.

Note that in certain embodiments, the preload flange may comprise a substantially cylindrical periphery associated with substantially longitudinal shear. Other embodiments may comprise a non-cylindrical periphery for facilitating annular shear preload having both longitudinal and transverse components associated with viscoelastic flow past the flange. Such an invention embodiment provides for damping of transverse as well as longitudinal vibration. Transverse vibration may originate, for example, when slight valve body misalignment with a valve seat causes abrupt lateral valve body movement during valve closing.

Note also that one or more flanges may or may not be longitudinally fixed to the guide stem for achieving one or more predetermined assembly resonant frequencies.

And note further that the first predetermined assembly resonant frequency of greatest interest, of course, will typically approximate one of the natural resonances of the pump and/or pump housing. Complementary hysteresis loss and vibration spectrum narrowing may be added via a second predetermined assembly resonant frequency achieved via the viscoelastic groove element (which may comprise at least one circular tubular area containing at least one shear-thickening material). The time-varying viscosity of the shear-thickening material(s), if present, furnishes a non-linear constraint of the vibrating structure analogous in part to that provided by the adjustable preload flange. The result is a predetermined shift of the tunable check valve assembly's vibrating mode analogous to that described above.

Note that when a nonlinear system is driven by a periodic function, such as can occur with harmonic excitation, chaotic dynamic behavior is possible. Depending on the nature of the nonlinear system, as well as the frequency and amplitude of the driving force, the chaotic behavior may comprise periodic oscillations, almost periodic oscillations, and/or coexisting (multistable) periodic oscillations and nonperiodic-nonstable trajectories (see Harris, p. 4-28).

In addition to a shift in the tunable check valve assembly's vibrating mode, incorporation of at least one circular tubular area containing at least one shear-thickening material within the viscoelastic groove element increases impulse duration by slightly slowing valve closure due to reinforcement of the viscoelastic groove element. Increased impulse duration, in turn, narrows the closing energy impulse vibration spectrum. And shear-thickening material itself is effectively constrained by its circular location within the viscoelastic groove element(s).

The shear-thickening material (sometimes, as noted above, termed dilatant material) is relatively stiff near the time of impact and relatively fluid at other times. Since the viscoelastic groove element strikes a valve seat before the valve body, complete valve closure is slightly delayed by the shear-thickening action. The delay effectively increases the valve-closure energy impulse's duration, which means that vibration which is transmitted from the tunable check valve assembly to its (optionally tunable) valve seat and pump housing has a relatively narrower spectrum and is less likely to excite vibrations that predispose a pump housing to early fatigue failure. The degree of spectrum narrowing can be tuned to minimize excitation of known pump housing resonances by appropriate choice of the shear-thickening material. Such vibration attenuation, and the associated reductions in metal fatigue and corrosion susceptibility, are especially beneficial in cases where the fluid being pumped is corrosive.

The functions of the viscoelastic groove element, with its circular shear-thickening material, are thus seen to include those of a conventional valve seal as well as those of a tunable vibration attenuator and a tunable vibration damper. See, e.g., U.S. Pat. No. 6,026,776, incorporated by reference. Further, the viscoelastic reservoir element, functioning with a predetermined annular shear preload provided via an adjustable preload flange, can dissipate an additional portion of valve-closure impulse energy as heat while also attenuating and damping vibration. And viscoelastic fenestration elements, when present, may contribute further to hysteresis loss as they elastically retain the groove element in the seal-retention groove via coupling to the reservoir element. Overall hysteresis loss in the viscoelastic elements combines with hysteresis loss in the valve body to selectively reduce the bandwidth, amplitude and duration of vibrations that the closing impulse energy would otherwise tend to excite in the valve and/or pump housing.

Examples of mechanisms for such selective vibration reductions are seen in the interactions of the viscoelastic reservoir element with the adjustable preload flange. The interactions contribute to hysteresis loss in a tunable check valve assembly by, for example, creating what has been termed shear damping (see, e.g., U.S. Pat. No. 5,670,006, incorporated by reference). With the preload flange adjustably fixed centrally to the check valve body (e.g., fixed to a central guide stem), valve-closure impact causes both the preload flange and guide stem to temporarily move distally with respect to the (peripheral) valve seat interface (i.e., the valve body experiences a concave-shaped flexure). The impact energy associated with valve closure causes temporary deformation of the check valve body; that is, the valve body periphery (e.g., the valve seat interface) is stopped by contact with a valve seat while the central portion of the valve body continues (under inertial forces and pumped-fluid pressure) to elastically move distally. Thus, the annular constrained area of the viscoelastic reservoir element (shown constrained by the preload flange in the schematic illustrations herein) moves substantially countercurrent (i.e., in shear) relative to the annular unconstrained area (shown radially farther from the guide stem and peripheral to the preload flange). That is, relative distal movement of the preload flange thus tends to extrude the (more peripheral) annular unconstrained area proximally. Energy lost (i.e., dissipated) in connection with the resulting shear strain in the viscoelastic element is subtracted from the total closing impulse energy otherwise available to excite destructive flow-induced vibration resonances in a valve, valve seat and/or pump housing. See, e.g., U.S. Pat. No. 5,158,162, incorporated by reference.

Note that in viscoelastic and shear-thickening materials, the relationship between stress and strain (and thus the effect of material constraint on resonant frequency) is generally time-dependent and non-linear. So a desired degree of non-linearity in "tuning" may be predetermined by appropriate choice of viscoelastic and shear-thickening materials in a tunable check valve assembly or tunable check valve.

Another aspect of the interaction of the viscoelastic reservoir element with an adjustable preload flange contributes to vibration damping and/or absorption in a tunable check valve assembly. As a result of compliance in the viscoelastic element, longitudinal movement of a guide stem and a coupled preload flange results in a phase lag as shear stress develops within the viscoelastic material. This is analogous to the phase lag seen in the outer ring movement in an automotive torsional vibration damper or the antiphase movement of small masses in an automotive pendulum vibration damper. See, e.g., the '776 patent cited above. Adjusting the shear preload flange as described above effectively changes the tunable check valve assembly's compliance and thus the degree of phase lag. One may thus, in one or more limited operational ranges, tune viscoelastic element preload to achieve effective vibration damping plus dynamic vibration absorption at specific frequencies of interest (e.g., pump housing resonant frequencies).

To achieve the desired hysteresis loss associated with attenuation and vibration damping effects described herein, different viscoelastic and/or composite elements may be constructed to have specific elastic and/or viscoelastic properties. Note that the term elastic herein implies substantial characterization by a storage modulus, whereas the term viscoelastic herein implies substantial characterization by a storage modulus and a loss modulus. See, e.g., the '006 patent cited above.

Specific desired properties for each viscoelastic element arise from a design concept requiring coordinated functions depending on the location of each element. The viscoelastic reservoir element affects hysteresis associated with longitudinal compliance of the tunable check valve assembly because it viscoelasticly accommodates longitudinal deformation of the valve body toward a concave shape. Hysteresis in the viscoelastic groove element (related, e.g., to its valve seal and vibration damping functions) and the valve body itself further reduces closing energy impulse amplitude through dissipation of portions of closing impulse energy as heat.

Elastic longitudinal compliance of a tunable check valve assembly results in part from elastic properties of the materials comprising the tunable check valve assembly. Such elastic properties may be achieved through use of composites comprising reinforcement materials as, for example, in an elastic valve body comprising steel, carbon fiber reinforced polymer, carbon nanotube/graphene reinforced polymer, and/or carbon nanotube/graphene reinforced metal matrix. The polymer may comprise a polyaryletherketone (PAEK), for example, polyetheretherketone (PEEK). See, e.g., U.S. Pat. No. 7,847,057 B2, incorporated by reference.

Note that the description herein of valve body flexure as concave-shaped refers to a view from the proximal or high-pressure side of the valve body. Such flexure is substantially elastic and may be associated with slight circular rotation (i.e., a circular rolling contact) of the valve body's valve seat interface with the valve seat itself. When the degree of rolling contact is sufficient to justify conversion of the valve seat interface from a conventional frusto-conical shape to a convex curved shape (which may include, e.g., circular, elliptic and/or parabolic portions), a curved concave tunable valve seat mating surface may be used. In such cases, the valve seat interface has correspondingly greater curvature than the concave tunable valve seat mating surface (see Detailed Description herein). Such rolling contact, when present, augments elastic formation of the concave valve body flexure on the pump pressure stroke, reversing the process on the suction stroke.

The circular rolling contact described herein may be visualized by considering the behavior of the convex valve seat interface as the valve body experiences concave flexure (i.e., the transformation from a relatively flat shape to a concave shape). During such flexure the periphery of the valve seat interface rotates slightly inwardly and translates slightly proximally (relative to the valve body's center of gravity) to become the proximal rim of the concave-shaped flexure.

While substantially elastic, each such valve body flexure is associated with energy loss from the closing energy impulse due to hysteresis in the valve body. Frictional heat loss (and any wear secondary to friction) associated with any circular rolling contact of the convex valve seat interface with the concave tunable valve seat mating surface is intentionally relatively low. Thus, the rolling action, when present, minimizes wear that might otherwise be associated with substantially sliding contact of these surfaces. Further, when rolling contact between valve body and tunable valve seat is present during both longitudinal valve body flexure and the elastic rebound which follows, trapping of particulate matter from the pumped fluid between the rolling surfaces tends to be minimized.

Since rolling contact takes place over a finite time interval, it also assists in smoothly redirecting pumped fluid momentum laterally and proximally. Forces due to oppositely directed radial components of the resultant fluid flow tend to cancel, and energy lost in pumped fluid turbulence is subtracted (as heat) from that of the valve-closure energy impulse, thus decreasing both its amplitude and the amplitude of associated vibration.

In addition to the above described energy dissipation (associated with hysteresis secondary to valve body flexure), hysteresis loss will also occur during pressure-induced movements of the viscoelastic groove element (in association with the valve seal function). Note that pumped fluid pressure acting on a valve comprising an embodiment of the invention's tunable check valve assembly may hydraulically pressurize substantially all of the viscoelastic elements in a tunable check valve assembly. Although polymers suitable for use in the viscoelastic elements generally are relatively stiff at room ambient pressures and temperatures, the higher pressures and temperatures experienced during pump pressure strokes tend to cause even relatively stiff polymers to behave like fluids which can transmit pressure hydraulically. Thus, a viscoelastic element in a peripheral seal-retention groove is periodically hydraulically pressurized, thereby increasing its sealing function during the high-pressure portion of the pump cycle. Hydraulic pressurization of the same viscoelastic element is reduced during the low-pressure portion of the pump cycle when the sealing function is not needed.

Because of the above-described energy loss and the time required for valve body longitudinal deformation to take place, with the associated dissipation of closing impulse energy described above, a valve-closure energy impulse applied to a tunable check valve assembly or tunable radial array is relatively lower in amplitude and longer in duration (e.g., secondary to having a longer rise time) than an analogous valve-closure energy impulse applied to a conventionally stiff valve body which closes on a conventional frustoconical valve seat. The combination of lower amplitude and increased duration of the valve-closure energy impulse results in a narrowed characteristic vibration bandwidth having reduced potential for induction of damaging resonances in the valve, valve seat, and adjacent portions of the pump housing. See, e.g., the above-cited '242 patent.

Note that in describing the fluid-like behavior of certain polymers herein under elevated heat and pressure, the term "polymer" includes relatively homogenous materials (e.g., a single-species fluid polymer) as well as composites and combination materials containing one or more of such relatively homogenous materials plus finely divided particulate matter (e.g., nanoparticles) and/or other dispersed species (e.g., species in colloidal suspension, graphene) to improve heat scavenging and/or other properties. See, e.g., U.S. Pat. No. 6,432,320 B1, incorporated by reference.

In addition to heat scavenging, damping is a function of the viscoelastic elements in various embodiments of the invention. Optimal damping is associated with relatively high storage modulus and loss tangent values, and is obtained over various temperature ranges in multicomponent systems described as having macroscopically phase-separated morphology, microheterogeneous morphology, and/or at least one interpenetrating polymer network. See, e.g., the above-cited '006 patent and U.S. Pat. Nos. 5,091,455; 5,238,744; 6,331,578 B1; and 7,429,220 B2, all incorporated by reference.

Summarizing salient points of the above description, recall that vibration attenuation and damping in a tunable check valve assembly, tunable valve seat, tunable plunger seal, or tunable radial array of the invention operate via four interacting mechanisms. First, impulse amplitude is reduced by converting a portion of total closing impulse energy to heat (e.g., via hysteresis and fluid turbulence), which is then ultimately rejected to the check valve body surroundings (e.g., the pumped fluid). Each such reduction of impulse amplitude means lower amplitudes in the characteristic vibration spectrum transmitted to the pump housing.

Second, the closing energy impulse as sensed at the valve seat is reshaped in part by lengthening the rebound cycle time (estimated as the total time associated with peripheral valve seal compression, concave valve body flexure and elastic rebound). Such reshaping may in general be accomplished using mechanical/hydraulic/pneumatic analogs of electronic wave-shaping techniques. In particular, lengthened rebound cycle time is substantially influenced by the valve body's increased longitudinal compliance associated with the rolling contact/seal and concave valve body flexure described herein between valve body and valve seat. The units of lengthened rebound cycle times are seconds, so their inverse functions have dimensions of per second (or 1/sec), the same dimensions as frequency. Thus, as noted above, the inverse function is termed herein rebound characteristic frequency.

Lowered rebound characteristic frequency (i.e., increased rebound cycle time) corresponds to slower rebound, with a corresponding reduction of the impulse's characteristic bandwidth due to loss of higher frequency content. This condition is created during impulse hammer testing by adding to hammer head inertia and by use of softer impact tips (e.g., plastic tips instead of the metal tips used when higher frequency excitation is desired). In contrast, tunable check valve assemblies and tunable radial arrays achieve bandwidth narrowing (and thus reduction of the damage potential of induced higher-frequency vibrations) at least in part through increased longitudinal compliance. In other words, bandwidth narrowing is achieved in embodiments of the invention through an increase of the effective impulse duration (as by, e.g., slowing the impulse's rise time and/or fall time as the valve assembly's components flex and relax over a finite time interval).

Third, induced vibration resonances of the tunable check valve assembly, tunable valve seat, and/or other tunable components are effectively damped by interactions generating structural hysteresis loss. Associated fluid turbulence further assists in dissipating heat energy via the pumped fluid.

And fourth, the potential for excitation of damaging resonances in pump vibration induced by a closing energy impulse is further reduced through narrowing of the impulse's characteristic vibration bandwidth by increasing the check valve body's effective inertia without increasing its actual mass. Such an increase of effective inertia is possible because a portion of pumped fluid moves with the valve body as it flexes and/or longitudinally compresses. The mass of this portion of pumped fluid is effectively added to the valve body's mass during the period of flexure/relaxation, thereby increasing the valve body's effective inertia to create a low-pass filter effect (i.e., tending to block higher frequencies in the manner of an engine mount).

To increase understanding of the invention, certain aspects of tunable components (e.g., alternate embodiments and multiple functions of structural features) are considered in greater detail. Alternate embodiments are available, for example, in guide means known to those skilled in the art for maintaining valve body alignment within a (suction or discharge) bore. Guide means thus include, but are not limited to, e.g., a central guide stem and/or a full-open or wing-guided design (i.e., having a distal crow-foot guide).

Similarly, alteration of a viscoelastic element's vibration pattern(s) in a tunable fluid end is addressed (i.e., tuned) via adjustable and/or time-varying constraints. Magnitude and timing of the constraints are determined in part by closing-impulse-related distortions and/or the associated vibration. For example, a viscoelastic reservoir (or central) element is at least partially constrained as it is disposed in the central annular reservoir, an unconstrained area optionally being open to pumped fluid pressure. That is, the viscoelastic reservoir element is at least partially constrained by relative movement of the interior surface(s) of the (optionally annular) reservoir, and further constrained by one or more structures (e.g., flanges) coupled to such surface(s). Analogously, a viscoelastic groove (or peripheral) element is at least partially constrained by relative movement of the groove walls, and further constrained by shear-thickening material within one or more circular tubular areas of the element (any of which may comprise a plurality of lumens).

Since the magnitude and timing of closing-impulse-related distortions are directly related to each closing energy impulse, the tunable fluid end's overall response is adaptive to changing pump operating pressures and speeds on a stroke-by-stroke basis. So for each set of operating parameters (i.e., for each pressure/suction stroke cycle), one or more of the constrained viscoelastic elements has at least a first predetermined assembly resonant frequency substantially similar to an instantaneous pump resonant frequency (e.g., a resonant frequency measured or estimated proximate the suction valve seat deck). And for optimal damping, one or more of the constrained viscoelastic elements may have, for example, at least a second predetermined assembly resonant frequency similar to the first predetermined assembly resonant frequency.

Note that the adaptive behavior of viscoelastic elements is beneficially designed to complement both the time-varying behavior of valves generating vibration with each pump pressure stroke, and the time-varying response of the fluid end as a whole to that vibration.

Note also that a tunable check valve assembly and/or tunable valve seat analogous to those designed for use in a tunable suction check valve may be incorporated in a tunable discharge check valve as well. Either a tunable suction check valve or a tunable discharge check valve or both may be installed in a pump fluid end housing. Additionally, one or more other tunable components may be combined with tunable suction and/or discharge check valves. A pump housing resonant frequency may be chosen as substantially equal to a first predetermined resonant frequency of each of the tunable components installed, or of any combination of the installed tunable components. Or the predetermined component resonant frequencies may be tuned to approximate different pump housing resonant frequencies as determined for optimal vibration damping.

For increased flexibility in accomplishing the above tuning, fenestrations may be present in the groove wall to accommodate radial tension members. At least a portion of each fenestration may have a transverse area which increases with decreasing radial distance to said longitudinal axis.

Note that in addition to the example alternate embodiments described herein, still other alternative invention embodiments exist, including valves, pump housings and pumps comprising one or more of the example embodiments or equivalents thereof. Additionally, use of a variety of fabrication techniques known to those skilled in the art may lead to embodiments differing in detail from those schematically illustrated herein. For example, internal valve body spaces may be formed during fabrication by welding (e.g., inertial welding or laser welding) valve body portions together as in the above-cited '837 patent, or by separately machining such spaces with separate coverings. Valve body fabrication may also be by rapid-prototyping (i.e., layer-wise and/or 3-D printing) techniques. See, e.g., the above-cited '057 patent. Viscoelastic elements may be cast and cured separately or in place in a valve body as described herein. See, e.g., U.S. Pat. No. 7,513,483 B1, incorporated by reference.

DETAILED DESCRIPTION

Installing one or more tunable check valves in a tunable fluid end facilitates selective attenuation of valve-generated vibration at its source. The likelihood of fluid end failures associated with fatigue cracking and/or corrosion fatigue is thereby reduced. Optimized vibration attenuation (via, e.g., optimized fluid end damping) is provided by altering resonant frequencies in each tunable component in relation to (e.g., less than, similar to, or greater than) one or more (measured or estimated) fluid end resonant frequencies and/or tunable component resonant frequencies.

Figure 7:
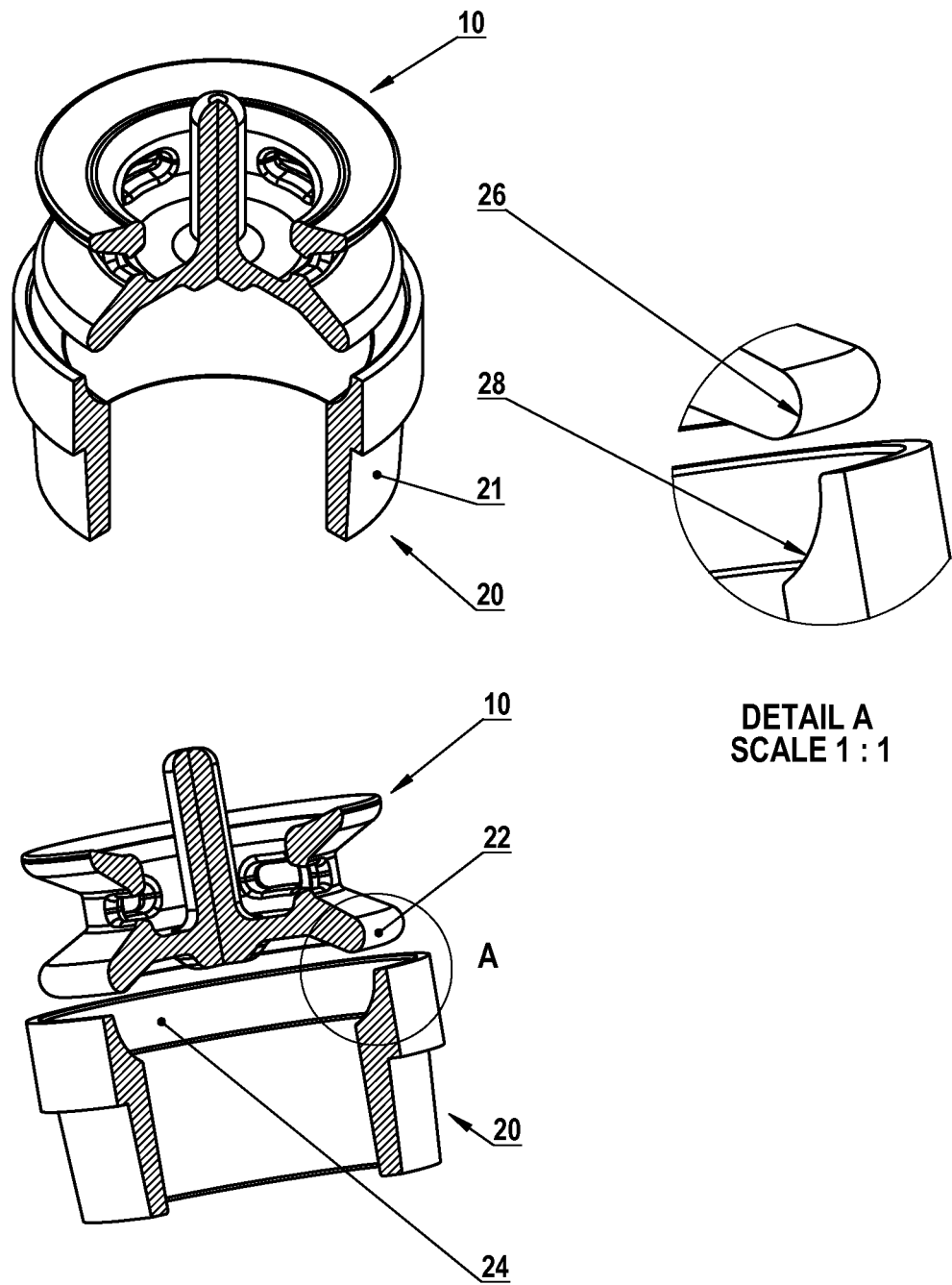
FIG. 7 is a schematic illustration of two views of an exploded partially-sectioned 3-dimensional view of a valve body and tunable valve seat embodiment. Curved longitudinal section edges of the valve body's convex valve seat interface and corresponding concave mating portions of the tunable valve seat are shown schematically in a detail breakout view to aid description herein of a rolling valve seal. A tunable (suction or discharge) check valve embodiment of the invention may comprise a combination of a tunable check valve assembly/tunable radial array (see, e.g., FIGS. 1 and 2) and a tunable valve seat embodiment (see, e.g., FIGS. 7 and 8).
Figure 11:
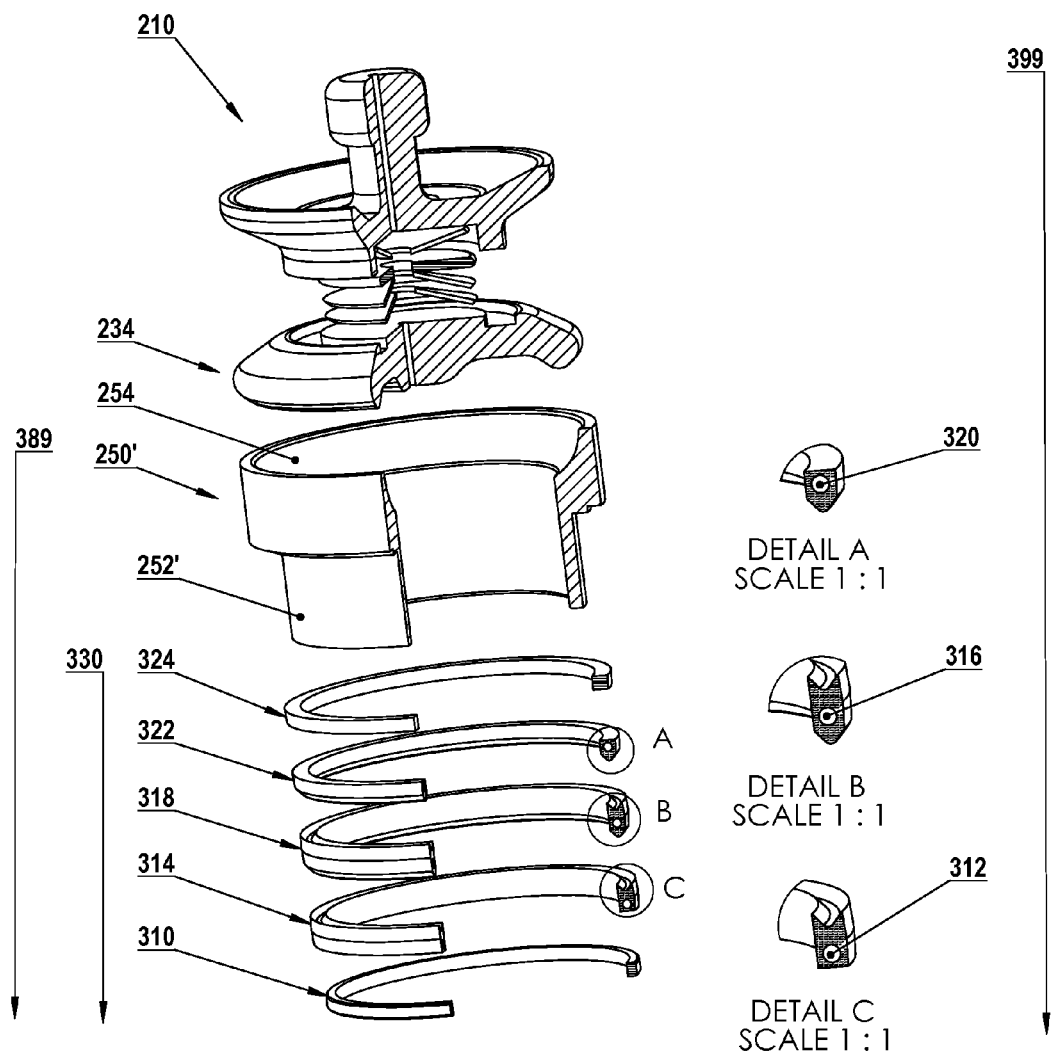
FIG. 11 is a schematic 3-dimensional exploded view of an alternate tunable check valve embodiment comprising the tunable check valve assembly of FIG. 9 together with a tunable valve seat, the tunable check valve embodiment including structures to facilitate a circular rolling contact seal between the check valve body's peripheral valve seat interface and the tunable valve seat's mating surface. An adjustable lateral support assembly is shown with the tunable valve seat, the assembly comprising first and second adjustable end spacers in combination with a plurality of tunable circular viscoelastic support elements, each support element shown in a detail breakout view as comprising a support circular tubular area.

In general, a tunable (suction or discharge) check valve of the invention may comprise, for example, a combination of a tunable check valve assembly/tunable radial array 99 (see, e.g., FIG. 1) and a tunable valve seat 20 or a tunable valve seat 389 (see, e.g., FIGS. 7 and 11). Details of the structure and functions of each component are provided herein both separately and as combined with other components to obtain synergistic benefits contributing to longer pump service life.

Figure 1:
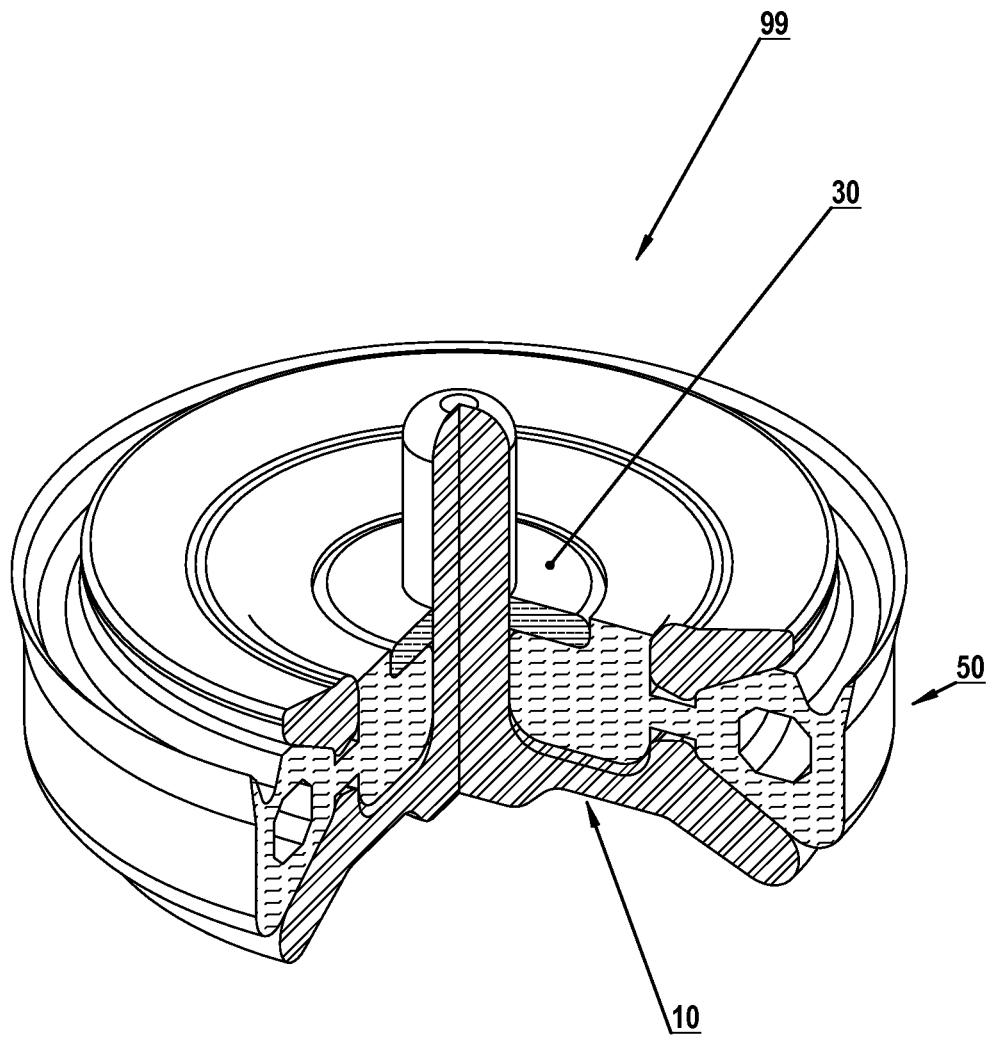
FIG. 1 is a schematic 3-dimensional view of a partially sectioned tunable check valve assembly/tunable radial array embodiment showing how an adjustable preload flange constrains an area of the viscoelastic reservoir element as described herein.
Figure 2:
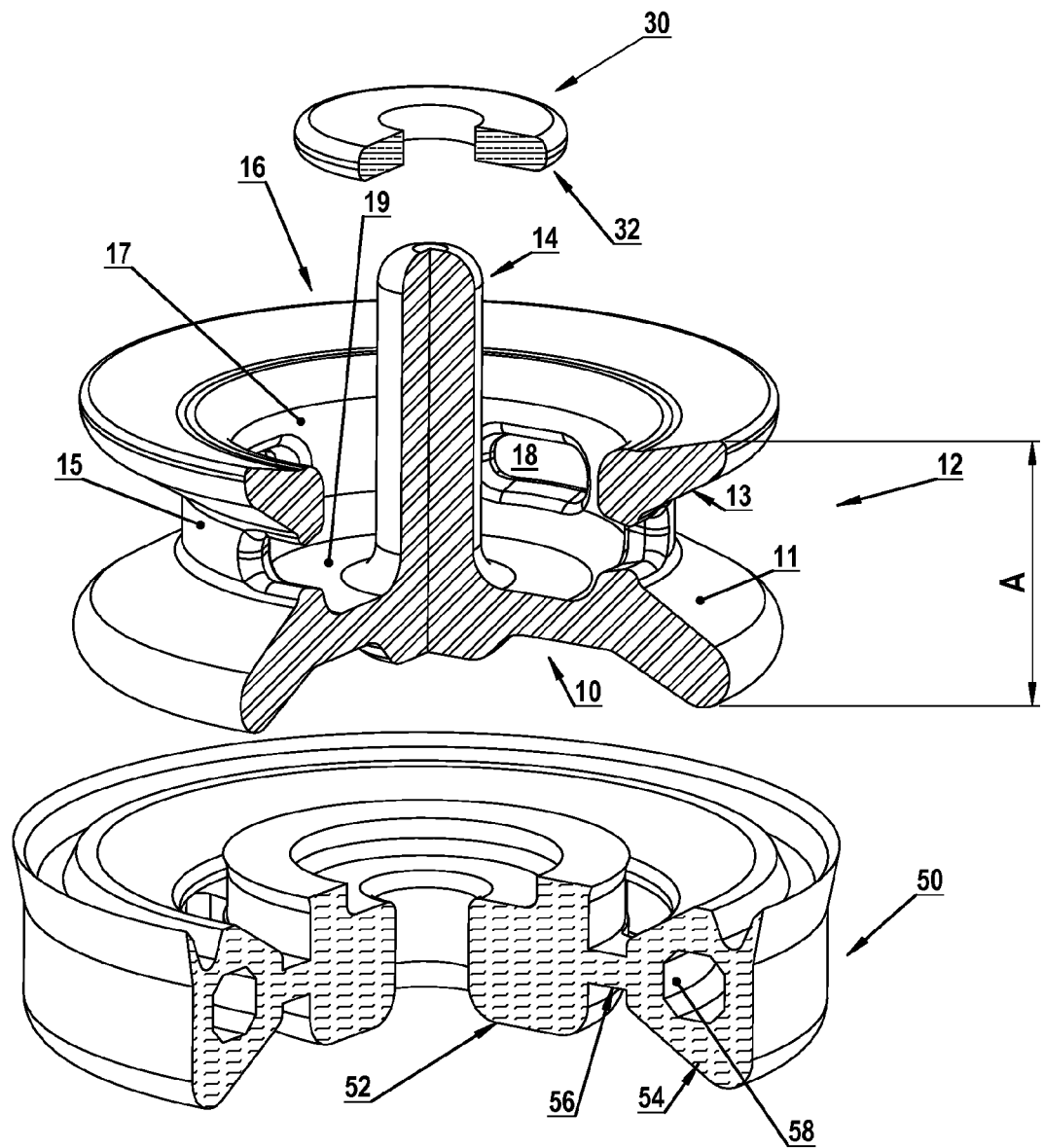
FIG. 2 includes a schematic 3-dimensional exploded view of the tunable check valve assembly/tunable radial array embodiment of FIG. 1 showing viscoelastic body elements, the valve body, a circumferential tubular area, radial tension members, a peripheral groove, a central reservoir, groove wall fenestrations, and the adjustable preload flange.

FIGS. 1 and 2 schematically illustrate an invention embodiment of a tunable check valve assembly/tunable radial array 99 substantially symmetrical about a longitudinal axis. Illustrated components include a valve body 10, an adjustable preload flange 30, and a plurality of viscoelastic body elements 50. Check valve body 10, in turn, comprises a peripheral groove 12 (see FIG. 2) spaced apart by an annular (central) reservoir 16 from a longitudinal guide stem 14, groove 12 being responsive to cyclical longitudinal compressive force. A plurality of viscoelastic body elements 50 comprises an annular (central) reservoir element 52 coupled to a (peripheral) groove element 54 by a plurality of (optional) radial fenestration elements 56 (in fenestrations 18) to form a tunable radial array. Groove element 54 functions as a vibration damper and valve seal, comprising at least one circular tubular area 58.

Responsiveness of groove 12 to cyclical longitudinal compressive force is characterized in part by damping of groove wall 11/13/15 vibrations. Such damping is due in part to out-of-phase vibrations in proximal groove wall 13 and distal groove wall 11 which are induced by longitudinal compressive force. Such out-of-phase vibrations will cause various groove-related dimensions to vary with cyclical longitudinal compressive force, thereby indicating the responsiveness of groove 12 to such force (see, for example, the dimension labeled A in FIG. 2). Each phase shift, in turn, is associated with differences in the coupling of proximal groove wall 13 to guide stem 14 (indirectly via longitudinal groove wall 15 and radial reservoir floor 19) and the coupling of distal groove wall 11 to guide stem 14 (directly via radial reservoir floor 19). Note that longitudinal groove wall 15 may comprise fenestrations 18, thereby increasing the responsiveness of groove 12 to cyclical longitudinal compressive force on tunable check valve assembly 99.

Figure 3:
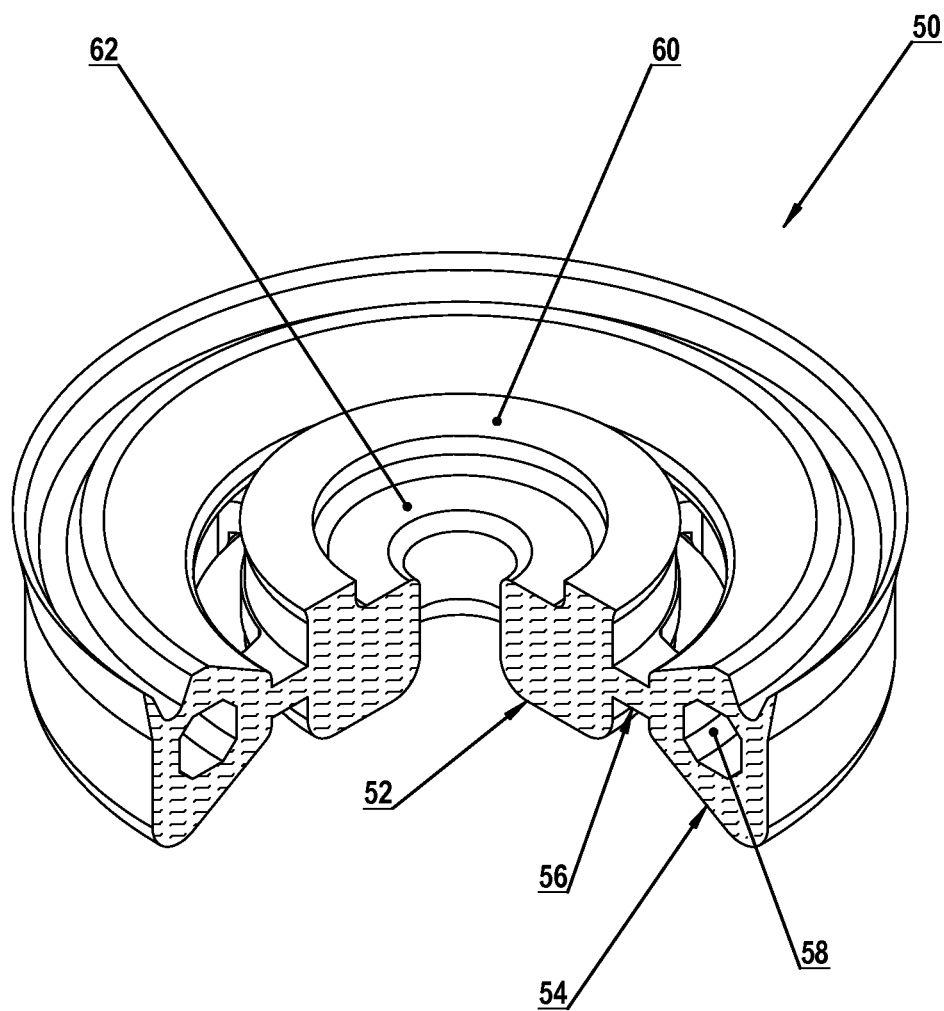
FIG. 3 is a schematic 3-dimensional partially-sectioned view of viscoelastic reservoir, groove and fenestration elements (i.e., viscoelastic body elements) of FIGS. 1 and 2 showing the constrained area of the reservoir element where it contacts an adjustable preload flange, as well as an adjacent unconstrained area.

Referring to FIGS. 1-3, adjustable preload flange 30 extends radially from guide stem 14 (toward peripheral reservoir wall 17) over, for example, about 20% to about 80% of viscoelastic reservoir element 52 (see FIG. 3). Adjustable preload flange 30 thus imposes an adjustable annular shear preload over an annular constrained area 62 of viscoelastic reservoir element 52 to achieve at least a first predetermined assembly resonant frequency substantially replicating a (similar) measured or estimated resonant frequency (e.g., a pump housing resonant frequency). Note that an adjacent annular unconstrained area 60 of viscoelastic reservoir element 52 remains open to pumped fluid pressure. Note also that adjustable preload flange 30 may be adjusted in effective radial extent and/or longitudinal position.

Note further that annular constrained area 62 and annular unconstrained area 60 are substantially concentric and adjacent. Thus, for a tunable suction valve subject to longitudinal (i.e., distally-directed) compressive constraint applied via preload flange 30 to annular constrained area 62, annular unconstrained area 60 will tend to move (i.e., extrude) proximally relative to area 62. The oppositely-directed (i.e., countercurrent) movements of constrained and unconstrained annular areas of viscoelastic reservoir element 52 create a substantially annular area of shear stress.

Figure 5:
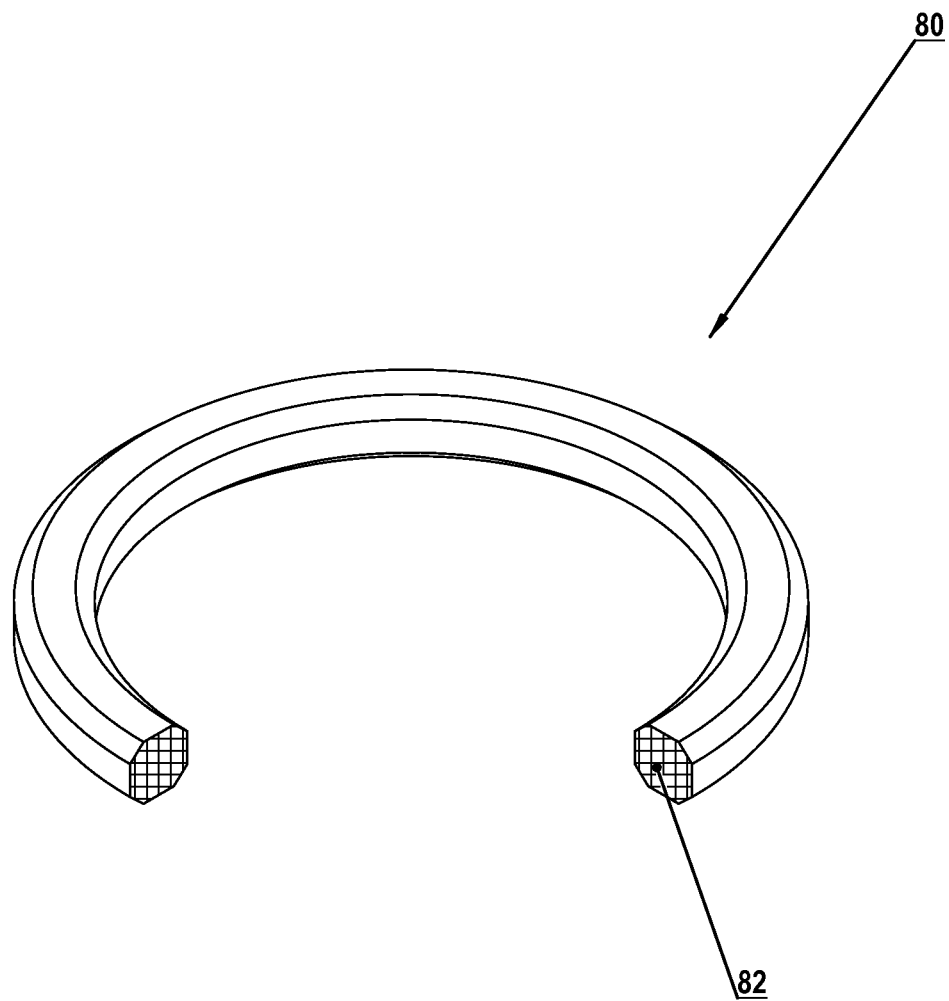
FIG. 5 is a schematic 3-dimensional instantaneous partially-sectioned view of fluid tuning medium comprising one or more shear-thickening materials which would, e.g., substantially fill a circular tubular area in the viscoelastic groove element and/or a support circular tubular area of a tunable valve seat or a tunable plunger seal.

Finally, each circular tubular area 58 is substantially filled with at least one shear-thickening material 80 (see FIG. 5) chosen to achieve at least a second predetermined assembly resonant frequency similar, for example, to the first predetermined assembly resonant frequency). Note that FIG. 5 schematically represents a longitudinally-sectioned view of an instantaneous configuration of the shear-thickening material 80 within circular tubular area 58.

Referring to FIGS. 1 and 2 in greater detail, a tunable check valve assembly/tunable radial array embodiment 99 comprises viscoelastic body elements 50 which comprise, in turn, reservoir (central) element 52 coupled to groove (peripheral) element 54 via radial fenestration (tension) elements 56. Elements 52, 54 and 56 are disposed in (i.e., integrated with and/or lie substantially in) reservoir 16, groove 12 and fenestrations 18 respectively to provide a tuned radial array having at least a third predetermined resonant frequency. An adjustable preload flange 30 is coupled to guide stem 14 and contacts viscoelastic reservoir element 52 in reservoir 16 to impose an adjustable annular constraint on viscoelastic reservoir element 52 for achieving at least a first predetermined assembly resonant frequency substantially similar to, for example, a measured resonant frequency (e.g., a pump housing resonant frequency). Such adjustable annular constraint imposes an adjustable shear preload between constrained annular area 62 and unconstrained annular area 60. Tunable check valve assembly 99 may additionally comprise at least one circular tubular area 58 in groove element 54 residing in groove 12, each tubular area 58 being substantially filled with at least one shear-thickening material 80 chosen to achieve at least a second predetermined assembly resonant frequency similar, for example, to the first predetermined assembly resonant frequency).

An analogous tuning procedure may be followed if the tunable check valve assembly of the second embodiment is installed in a pump having a (similar or different) resonant frequency substantially equal to the second predetermined resonant frequency.

Note that preload flange 30 may have a non-cylindrical periphery 32 for imposing on viscoelastic reservoir element 52 an adjustable annular shear preload having both longitudinal and transverse components.

Figure 4:
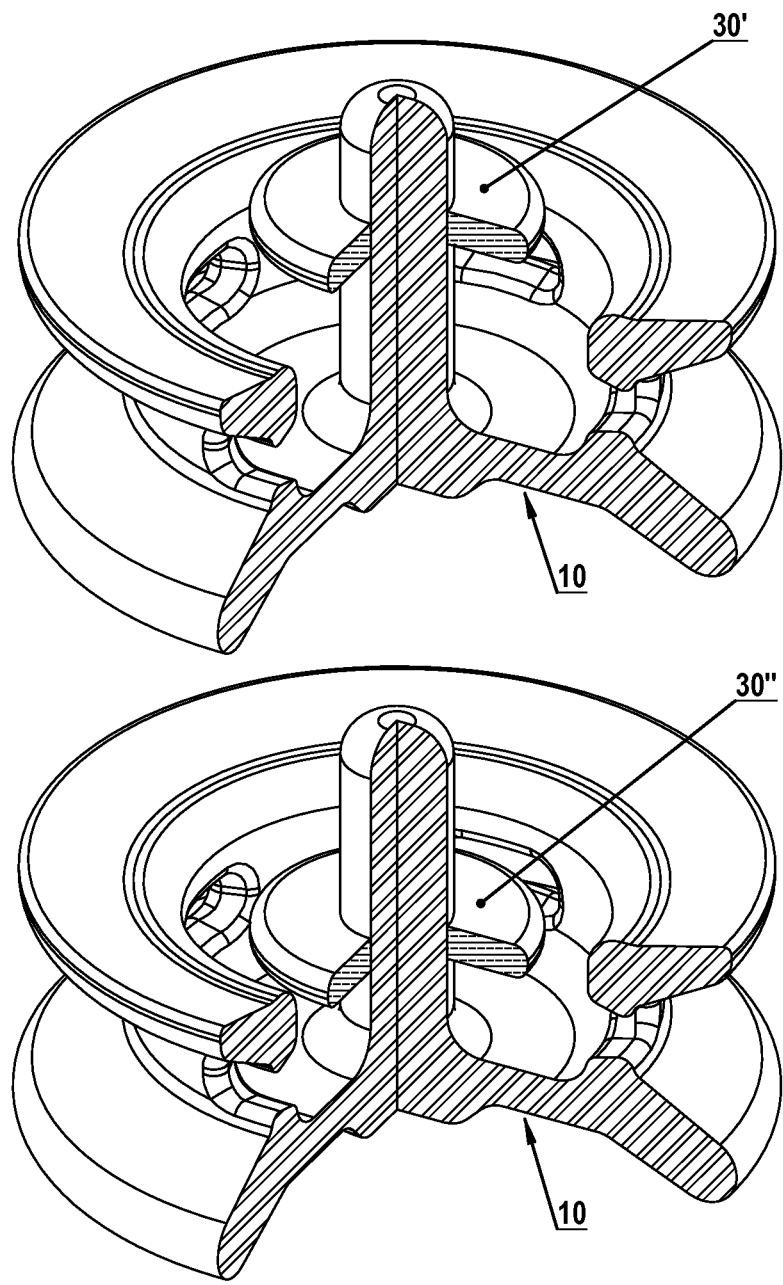
FIG. 4 is a schematic 3-dimensional partially-sectioned view of two of the check valve bodies of FIG. 2, each check valve body with an adjustable preload flange located at different longitudinal positions on a central guide stem for the purpose of tuning.

Note further that the periphery of adjustable preload flange 30, if cylindrical, predisposes a tunable check valve assembly to substantially longitudinal shear damping with each longitudinal distortion of check valve body 10 associated with valve closure. The character of such shear damping depends, in part, on the longitudinal position of the preload flange. Examples of different longitudinal positions are seen in FIG. 4, which schematically illustrates the flange 30' longitudinally displaced from flange 30". Further, as shown in FIG. 4, the convex periphery of a longitudinally adjusted preload flange 30' or 30" may introduce shear damping of variable magnitude and having both longitudinal and transverse components. Such damping may be beneficial in cases where significant transverse valve-generated vibration occurs.

To clarify the placement of viscoelastic body elements 50, labels indicating the portions are placed on a sectional view in FIGS. 2 and 3. Actual placement of viscoelastic body elements 50 in valve body 10 (see FIG. 1) may be by, for example, casting viscoelastic body elements 50 in place, or placing viscoelastic body elements 50 (which have been precast) in place during layer-built or welded fabrication.

To enhance scavenging of heat due to friction loss and/or hysteresis loss, shear-thickening material 80 and/or viscoelastic body elements 50 may comprise one or more polymers which have been augmented with nanoparticles and/or graphene 82 (see, e.g., FIG. 5). Nanoparticles and/or graphene may be invisible to the eye as they are typically dispersed in a colloidal suspension. Hence, they are schematically represented by cross-hatching 82 in FIG. 5. Nanoparticles may comprise, for example, carbon forms (e.g., graphene) and/or metallic materials such as copper, beryllium, titanium, nickel, iron, alloys or blends thereof. The term nanoparticle may conveniently be defined as including particles having an average size of up to about 2000 nm. See, e.g., the '320 patent.

Figure 6:
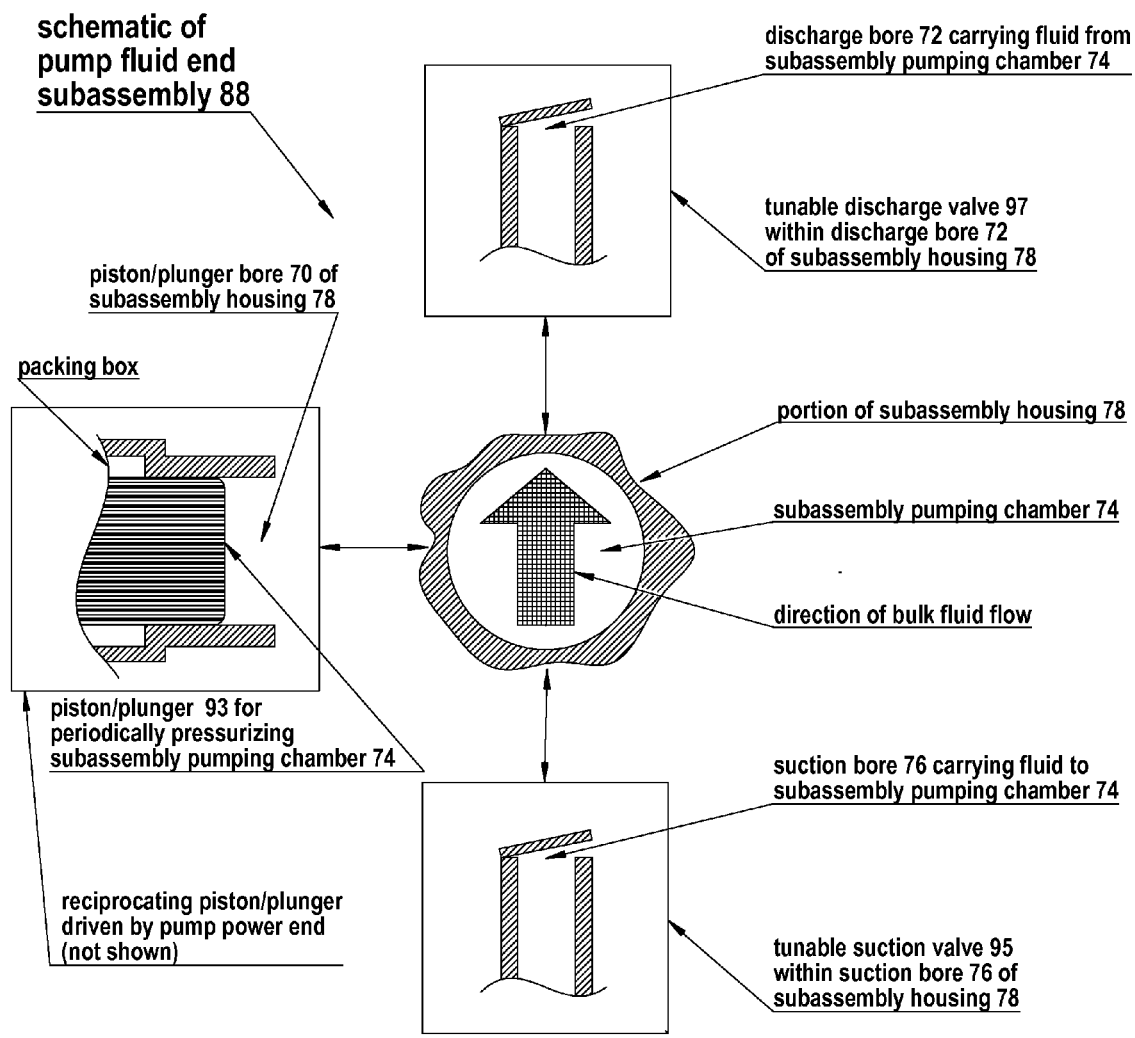
FIG. 6 is a schematic illustration of an exploded partially-sectioned 2-dimensional view of major components of a pump fluid end subassembly, together with brief explanatory comments on component functions. The schematically-illustrated subassembly comprises a pumping chamber within a subassembly pump housing, the pumping chamber being in fluid communication with a suction bore, a discharge bore, and a piston/plunger bore. Schematic representations of a suction check valve, a discharge check valve, and a piston/plunger are shown in their respective bores, together with brief annotations and graphical aids outlining the structural relationships.

FIG. 6 is a schematic illustration of an exploded partially-sectioned 2-dimensional view of major components of a pump fluid end subassembly 88, together with graphical aids and brief explanatory comments on component functions. The schematically-illustrated subassembly 88 comprises a pumping chamber 74 within a subassembly (pump) housing 78, the pumping chamber 74 being in fluid communication with a suction bore 76, a discharge bore 72, and a piston/plunger bore 70. Note that piston/plunger bore 70 comprises at least one recess (analogous to that labeled "packing box" in FIG. 6) in which at least one lateral support assembly 130 (see FIG. 8) may be sealingly positionable along the plunger as part of a tunable plunger seal embodiment. Schematic representations of a tunable suction valve 95 (illustrated for simplicity as a hinged check valve), a tunable discharge valve 97 (also illustrated for simplicity as a hinged check valve), and a piston/plunger 93 (illustrated for simplicity as a plunger) are shown in their respective bores. Note that longitudinally-moving valve bodies in check valve embodiments schematically illustrated herein (e.g., valve body 10) are associated with certain operational phenomena analogous to phenomena seen in hinged check valves (including, e.g., structural compliance secondary to closing energy impulses).

Regarding the graphical aids of FIG. 6, the double-ended arrows that signify fluid communication between the bores (suction, discharge and piston/plunger) and the pumping chamber are double-ended to represent the fluid flow reversals that occur in each bore during each transition between pressure stroke and suction stroke of the piston/plunger. The large single-ended arrow within the pumping chamber is intended to represent the periodic and relatively large, substantially unidirectional fluid flow from suction bore through discharge bore during pump operation.

Further regarding the graphical aids of FIG. 6, tunable suction (check) valve 95 and tunable discharge (check) valve 97 are shown schematically as hinged check valves in FIG. 6 because of the relative complexity of check valve embodiments having longitudinally-moving valve bodies. More detailed schematics of several check valve assemblies and elements are shown in FIGS. 1-11, certain tunable check valve embodiments comprising a tunable check valve assembly and a tunable valve seat. In general, the tunable check valve assemblies/tunable radial arrays of tunable suction and discharge valves will typically be tuned to different assembly resonant frequencies because of their different positions in a subassembly housing 78 (and thus in a pump housing as described herein). Pump housing resonant frequencies that are measured proximate the tunable suction and discharge valves will differ in general, depending on the overall pump housing design. In each case they serve to guide the choices of the respective assembly resonant frequencies for the valves.

Note that the combination of major components labeled in FIG. 6 as a pump fluid end subassembly 88 is so labeled (i.e., is labeled as a subassembly) because typical fluid end configurations comprise a plurality of such subassemblies combined in a single machined block. Thus, in such typical (multi-subassembly) pump fluid end designs, as well as in less-common single-subassembly pump fluid end configurations, the housing is simply termed a "pump housing" rather than the "subassembly housing 78" terminology of FIG. 6.

Further as schematically-illustrated and described herein for clarity, each pump fluid end subassembly 88 comprises only major components: a pumping chamber 74, with its associated tunable suction valve 95, tunable discharge valve 97, and piston/plunger 93 in their respective bores 76, 72 and 70 of subassembly housing 78. For greater clarity of description, common fluid end features well-known to those skilled in the art (such as access bores, plugs, seals, and miscellaneous fixtures) are not shown. Similarly, a common suction manifold through which incoming pumped fluid is distributed to each suction bore 76, and a common discharge manifold for collecting and combining discharged pumped fluid from each discharge bore 72, are also well-known to those skilled in the art and thus are not shown.

Note that the desired check-valve function of tunable check valves 95 and 97 schematically-illustrated in FIG. 6 requires interaction of the respective tunable check valve assemblies (see, e.g., FIGS. 1-5) with a corresponding (schematically-illustrated) tunable valve seat (see, e.g., FIGS. 7, 8, 10 and 11). The schematic illustrations of FIG. 6 are only intended to convey general ideas of relationships and functions of the major components of a pump fluid end subassembly. Structural details of the tunable check valve assemblies that are in turn part of tunable check valves 95 and 97 of the invention (including their respective tunable valve seats) are illustrated in greater detail in other figures as noted above. Such structural details facilitate a plurality of complementary functions that are best understood through reference to FIGS. 1-5 and 7-11.

The above complementary functions of tunable check valves include, but are not limited to, closing energy conversion to heat via structural compliance, energy redistribution through rejection of heat to the pumped fluid and pump housing, vibration damping and/or selective vibration spectrum narrowing through changes in tunable check valve assembly compliance, vibration frequency down-shifting (via decrease in rebound characteristic frequency) through increase of rebound cycle time, and selective vibration attenuation through energy dissipation (i.e., via redistribution) at predetermined assembly resonant frequencies.

FIG. 7 is a schematic illustration of two views of an exploded partially-sectioned 3-dimensional view including a check valve body 10 and its convex valve seat interface 22, together with concave mating surface 24 of tunable valve seat 20. Mating surface 24 is longitudinally spaced apart from a pump housing interface surface 21. A curved longitudinal section edge 28 of the tunable valve seat's mating surface 24, together with a correspondingly greater curved longitudinal section edge 26 of the valve body's valve seat interface 22, are shown schematically in detail view A to aid description herein of a rolling valve seal.

The correspondingly greater curvature of valve seat interface 22, as compared to the curvature of mating surface 24, effectively provides a circular rolling contact seal against fluid leakage which reduces wear on the surfaces in contact. The circular rolling contact seal also increases longitudinal compliance of a tunable suction or discharge valve of the invention, with the added benefit of increasing the rise and fall times of the closing energy impulse (thus narrowing the associated vibration spectrum). Widening the closing energy impulse in the time domain means an increased rebound cycle time, with corresponding decrease in rebound characteristic frequency.

Further regarding the terms "correspondingly greater curvature" or "correspondingly less curvature" as used herein, note that the curvatures of the schematically illustrated longitudinal section edges (i.e., 26 and 28) and the surfaces of which they are a part (i.e., valve seat interface 22 and mating surface 24 respectively) are chosen so that the degree of longitudinal curvature of valve seat interface 22 (including edge 26) exceeds that of (i.e., has correspondingly greater curvature than) mating surface 24 (including edge 28) at any point of rolling contact. In other words, mating surface 24 (including edge 28) has correspondingly less curvature than valve seat interface 22 (including edge 26). Hence, rolling contact (i.e., a rolling valve seal) between valve seat interface 22 and mating surface 24 is along a substantially circular line. That is, mating surface 24 is a curved mating surface for providing decreased contact area along the circular line, compared to the larger contact area provided by conventional frusto-conical contact surfaces. The plane of the circular line is generally transverse to the (substantially coaxial) longitudinal axes of valve body 10 and tunable valve seat 20. In greater detail, description of a decreased contact area herein refers to comparison of the narrow contact area (i.e., along a substantially circular line) inherent in a rolling valve seal in relation to the relatively broad contact area theoretically available between the nominally frusto-conical contact surfaces of a conventional valve seat interface and a corresponding frusto-conical valve seat.

In summary, the valve body comprises a peripheral valve seat interface having a convex curvature. The valve seat interface undergoes a substantially elastic concave flexure with slight circular rotation as the valve body seats against a valve seat having a concave mating surface with correspondingly less curvature than the peripheral valve seat interface. As a result, the peripheral valve seat interface achieves a circular rolling contact with the mating surface of the valve seat.

Alternatively, the valve seat mating has a concave curvature that forms a circular rolling contact seal with a valve body as the valve body seats against the mating surface. The valve body has a convex peripheral valve seat interface with a correspondingly greater curvature than the mating surface. And the curvature of the mating surface causes the valve seat interface to undergo a substantially elastic concave flexure with slight circular rotation to form the circular rolling contact seal.

Note also that although valve seat interface 22 and mating surface 24 (and other valve seat interface/mating surface combinations described herein) are schematically illustrated as curved, either may be frusto-conical (at least in part) in certain tuned component embodiments. Such frusto-conical embodiments may have lower fabrication costs and may exhibit suboptimal distortion, down-shifting performance and/or wear characteristics. They may be employed in relatively lower-pressure applications where other tunable component characteristics provide sufficient operational advantages in vibration control.

Figure 8:
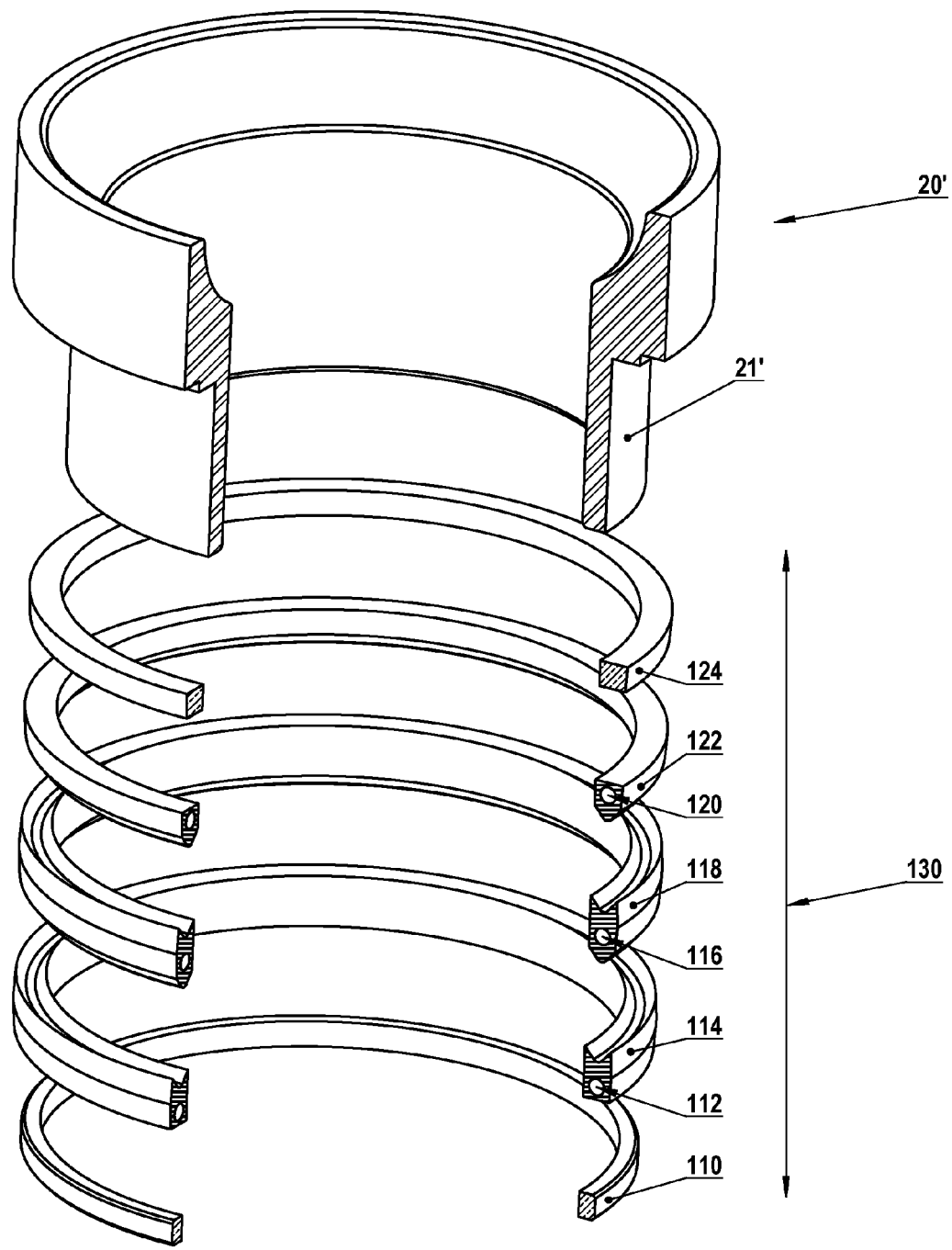
FIG. 8 is a schematic 3-dimensional exploded and partially-sectioned view of a tunable valve seat embodiment showing a concave mating surface longitudinally spaced apart from a lateral support mounting surface, and an adjustable lateral support assembly comprising first and second adjustable end spacers in combination with a plurality of circular viscoelastic support elements, each support element comprising a support circular tubular area. Each support circular area potentially contains a fluid tuning medium comprising one or more shear-thickening materials, electively augmented with nanoparticles.

The above discussion of rolling contact applies to the alternate tunable valve seat 20' of FIG. 8, as it does to the tunable valve seat 20 of FIG. 7. FIG. 8 schematically illustrates a 3-dimensional exploded and partially-sectioned view of a tunable valve seat showing a mating surface (analogous to mating surface 24 of FIG. 7) longitudinally spaced apart from a lateral support mounting surface 21'. But the lateral support mounting surface 21' in FIG. 8 differs from pump housing interface surface 21 of FIG. 7 in that it facilitates adjustably securing a lateral support assembly 130 to alternate tunable valve seat 20'. Lateral support assembly 130 comprises first and second adjustable end spacers (110 and 124 respectively) in combination with a plurality of circular viscoelastic support elements (114, 118 and 122), each support element comprising a support circular tubular area (see areas 112, 116 and 120 respectively). Shear-thickening material in each support circular tubular area 112, 116 and 120 is chosen so each lateral support assembly 130 has at least one predetermined resonant frequency. Lateral support assemblies thus configured may be part of each tunable valve seat and each tunable plunger seal. When part of a tunable plunger seal, one or more lateral support assemblies 130 reside in at least one recess analogous to the packing box schematically illustrated adjacent to piston/plunger 93 (i.e., as a portion of piston/plunger bore 70) in FIG. 6.

Note also that in general, a tunable (suction or discharge) check valve of the invention may comprise a combination of a tunable check valve assembly 99 (see, e.g., FIG. 1) and a tunable valve seat 20 (see, e.g., FIG. 7) or a tunable valve seat 20' (see, e.g., FIG. 8). Referring more specifically to FIG. 6, tunable suction check valve 95 is distinguished from tunable discharge check valve 97 by one or more factors, including each measured resonant frequency to which each tunable check valve is tuned so as to optimize the overall effectiveness of valve-generated vibration attenuation in the associated pump housing 78.

Figure 9:
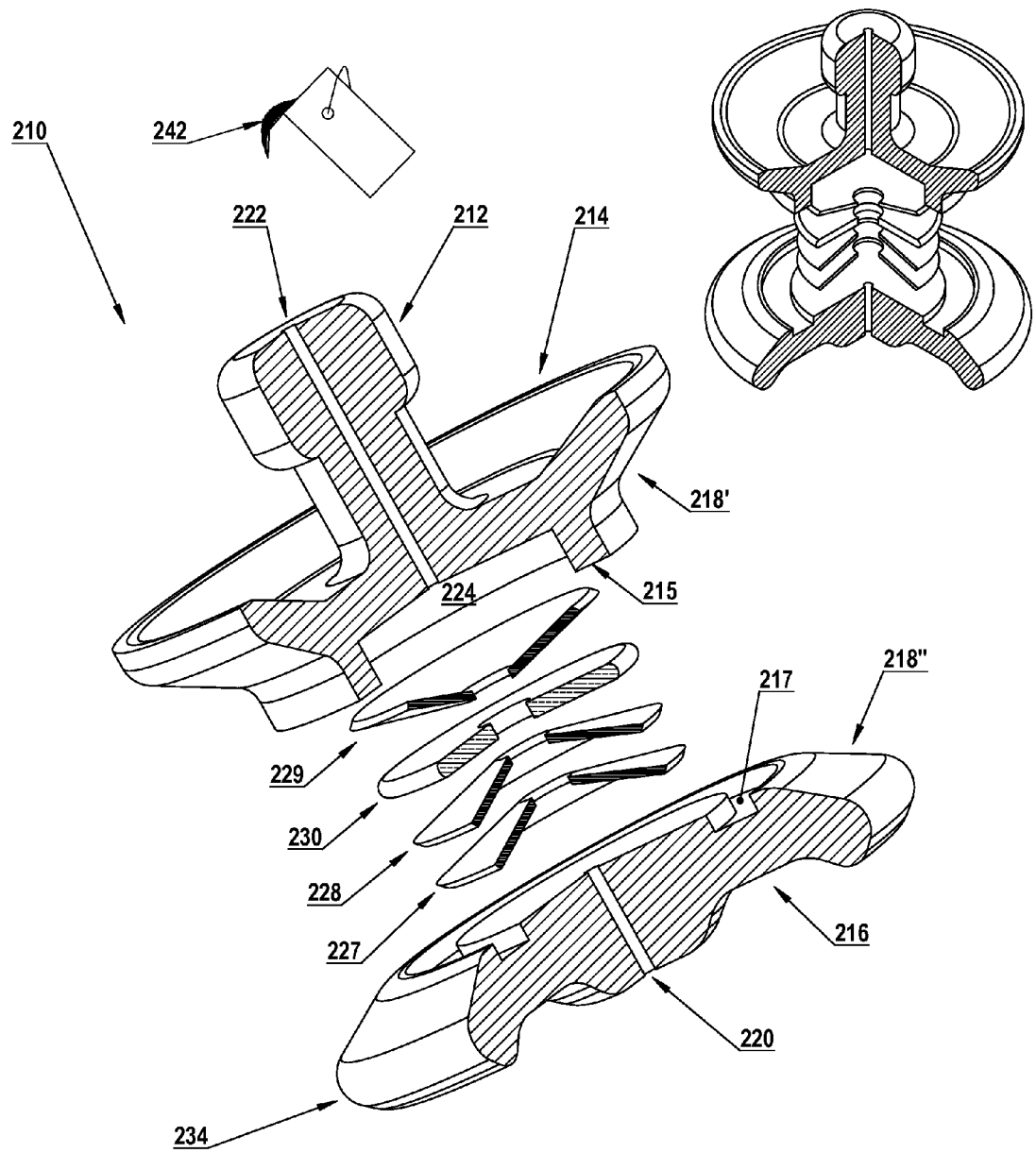
FIG. 9 is a schematic 3-dimensional exploded view of a partially sectioned tunable check valve assembly embodiment. A dilatant (i.e., shear-thickening) material in a fluid tuning medium 242 is schematically shown being added to a check valve body's internal cavity, the cavity being shown as enclosing a tuned vibration damper comprising discrete mechanical elements (e.g., a mass and three Belleville springs). Interaction of the Belleville springs 227 and 228 with the shear-thickening material results in nonlinear damping as the springs are cyclically compressed and released.
Figure 10:
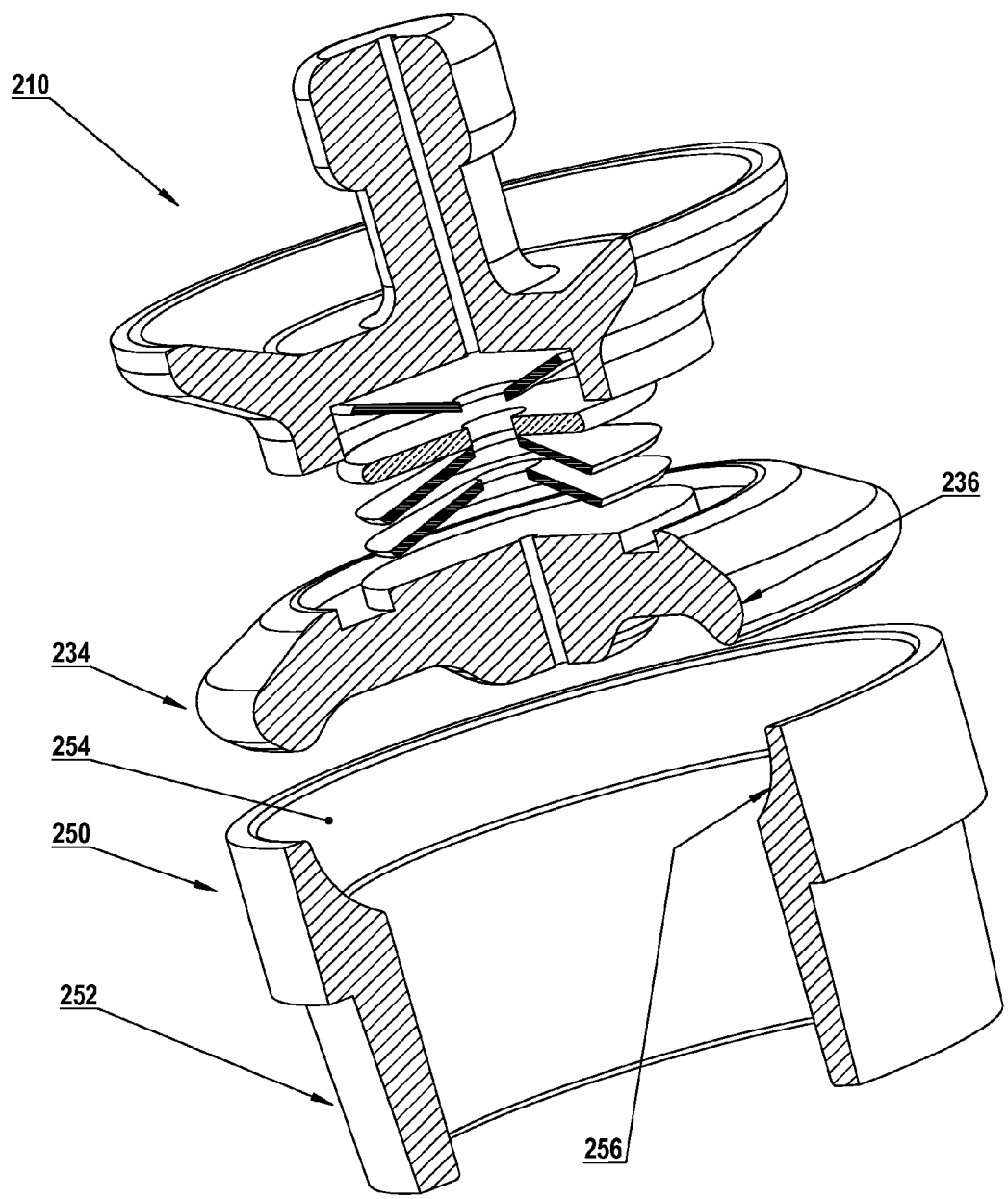
FIG. 10 is a schematic 3-dimensional exploded view of a tunable check valve embodiment comprising the tunable check valve assembly of FIG. 9 together with a tunable valve seat, the tunable check valve embodiment including structures to facilitate a circular rolling contact seal between the valve body's valve seat interface and the tunable valve seat's mating surface. Note that the (convex) valve seat interface has correspondingly greater curvature than the (concave) mating surface, and the mating surface has correspondingly less curvature than the valve seat interface.

FIGS. 9-11 show schematic exploded views of a nonlinear spring-mass damper 227/228/229/230, which may be incorporated in a tunable check valve assembly embodiment 210. FIGS. 9-11 can each be understood as schematically illustrating a tunable check valve assembly with or without a peripheral groove viscoelastic element. That is, each figure may also be understood to additionally comprise a viscoelastic groove element analogous to groove element 54 (see FIG. 2) residing in groove 218'/218'' (see FIG. 9)—this groove element is not shown in exploded FIGS. 9-11 for clarity, but may be considered to comprise at least one circular tubular area analogous to tubular area 58 in groove element 54 (see FIG. 2), each tubular area 58 being substantially filled with at least one shear-thickening material 80 chosen to achieve at least one predetermined assembly resonant frequency.

Referring to FIG. 9, Belleville springs 227/228/229 are nonlinear, and they couple mass 230 to the valve body base plate 216 and the proximal valve body portion 214. Additionally, dilatant fluid (i.e., fluid tuning medium) 242 is optionally added (via sealable ports 222 and/or 220) to central internal cavity 224 to immerse nonlinear spring-mass damper 227/228/229/230. The nonlinear behavior of fluid tuning medium 242 in shear (as, e.g., between Belleville springs 227 and 228) expands the range of tuning the nonlinear spring-mass damper 227/228/229/230 to a larger plurality of predetermined frequencies to reduce "ringing" of valve body 214/216 in response to a closing energy impulse.

To clarify the function of nonlinear spring-mass damper 227/228/229/230, mass 230 is shown perforated centrally to form a washer shape and thus provide a passage for flow of fluid tuning medium 242 during longitudinal movement of mass 230. This passage is analogous to that provided by each of the Belleville springs 227/228/229 by reason of their washer-like shape.

FIG. 10 shows an exploded view of an alternate embodiment of a tunable check valve comprising the tunable check valve assembly 210 of FIG. 9, plus a tunable valve seat 250. FIGS. 10 and 11 schematically illustrate two views of an exploded partially-sectioned 3-dimensional view including a valve body 214/216 and its valve seat interface 234, together with mating surface 254 of tunable valve seats 250 and 250'. Mating surface 254 is longitudinally spaced apart from pump housing interface surface 252 in FIG. 10, and from lateral support mounting surface 252' in FIG. 11. In FIG. 10, a curved longitudinal section edge 256 of the tunable valve seat's mating surface 254, together with a correspondingly greater curved longitudinal section edge 236 of valve seat interface 234, are shown schematically to aid description herein of a rolling valve seal.

Note that valve body 214/216 may be fabricated by several methods, including that schematically illustrated in FIGS. 9-11. For example, circular boss 215 on proximal valve body portion 214 may be inertia welded or otherwise joined to circular groove 217 on valve body base plate 216. Such joining results in the creation of peripheral seal-retention groove 218'/218" having proximal groove wall 218' and distal groove wall 218".

To enhance scavenging of heat due to friction loss and/or hysteresis loss, fluid polymer(s) in fluid tuning medium 242 may be augmented by adding nanoparticles which are generally invisible to the eye as they are typically dispersed in a colloidal suspension. Nanoparticles comprise, for example, carbon and/or metallic materials such as copper, beryllium, titanium, nickel, iron, alloys or blends thereof. The term nanoparticle may conveniently be defined as including particles having an average size of up to about 2000 nm. See, e.g., the '320 patent.

The correspondingly greater curvature of valve seat interface 234, as compared to the curvature of mating surface 254, effectively provides a circular rolling contact seal against fluid leakage which reduces frictional wear on the surfaces in contact. The circular rolling contact seal also increases longitudinal compliance of a tunable suction or discharge valve of the invention, with the added benefit of increasing the rise and fall times of the closing energy impulse (thus narrowing the associated vibration spectrum).

Further regarding the term "correspondingly greater curvature" as used herein, note that the curvatures of the schematically illustrated longitudinal section edges (i.e., 236 and 256) and the surfaces of which they are a part (i.e., valve seat interface 234 and mating surface 254 respectively) are chosen so that the degree of longitudinal curvature of valve seat interface 234 (including edge 236) exceeds that of (i.e., has correspondingly greater curvature than) mating surface 254 (including edge 256) at any point of rolling contact. Hence, rolling contact between valve seat interface 234 and mating surface 254 is always along a substantially circular line that decreases contact area relative to the (potentially variable) contact area of a (potentially distorted) conventional frusto-conical valve body/valve seat interface (see discussion above). The plane of the circular line is generally transverse to the (substantially coaxial) longitudinal axes of valve body 214/216 and tunable valve seat 250. (See notes above re frusto-conical valve seat interface shapes and mating surfaces).

The above discussion of rolling contact applies to the alternate tunable valve seat 250' of FIG. 11, as it does to the tunable valve seat 250 of FIG. 10. But the lateral support mounting surface 252' in tunable check valve 399 of FIG. 11 differs from pump housing interface surface 252 of FIG. 10 in that it facilitates adjustably securing a lateral support assembly 330 to alternate tunable valve seat 250' to form tunable valve seat 389. Lateral support assembly 330 comprises first and second adjustable end spacers (310 and 324 respectively) in combination with a plurality of tunable circular viscoelastic support elements (314, 318 and 322). Each support element comprises a support circular tubular area (312, 316 and 320 respectively), each tubular area being substantially filled with at least one shear-thickening material 80 (see, e.g., FIG. 5) chosen to achieve at least one predetermined assembly resonant frequency.

Note that in general, a tunable (suction or discharge) check valve of the invention may comprise a combination of a tunable check valve assembly 210 (see, e.g., FIG. 9) and a tunable valve seat 250 (see, e.g., FIG. 10) or a tunable valve seat 250' (see, e.g., FIG. 11). Referring more specifically to FIG. 6, tunable suction valve 95 is distinguished from tunable discharge check valve 97 by one or more factors, including each measured or estimated resonant frequency to which each tunable check valve is tuned so as to optimize the overall effectiveness of valve-generated vibration attenuation in the associated pump housing 78.

Figure 12:
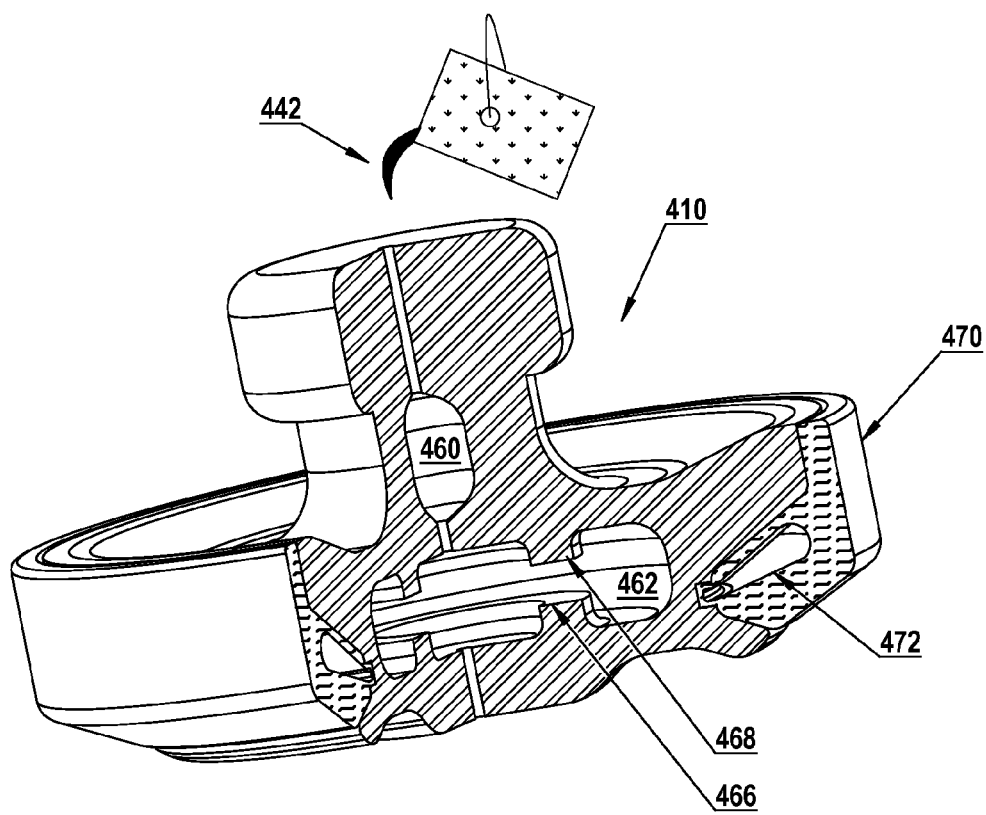
FIG. 12 illustrates longitudinal sections of two schematic 3-dimensional views of an alternate tunable check valve assembly embodiment comprising a plurality of radially-spaced vibration dampers disposed in a valve body having a peripheral seal. Each vibration damper comprises a circular tubular area, and at least one vibration damper is tunable via a fluid tuning medium in a tubular area. A central fluid tuning medium is shown schematically being added to the central circular tubular area. A fluid tuning medium may comprise, e.g., one or more shear-thickening materials.
Figure 12:
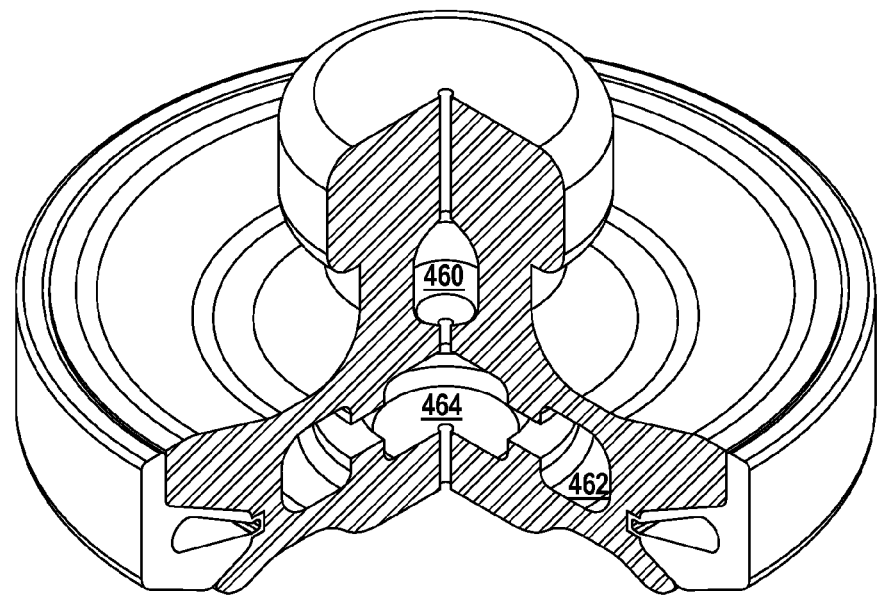
Figure 13:
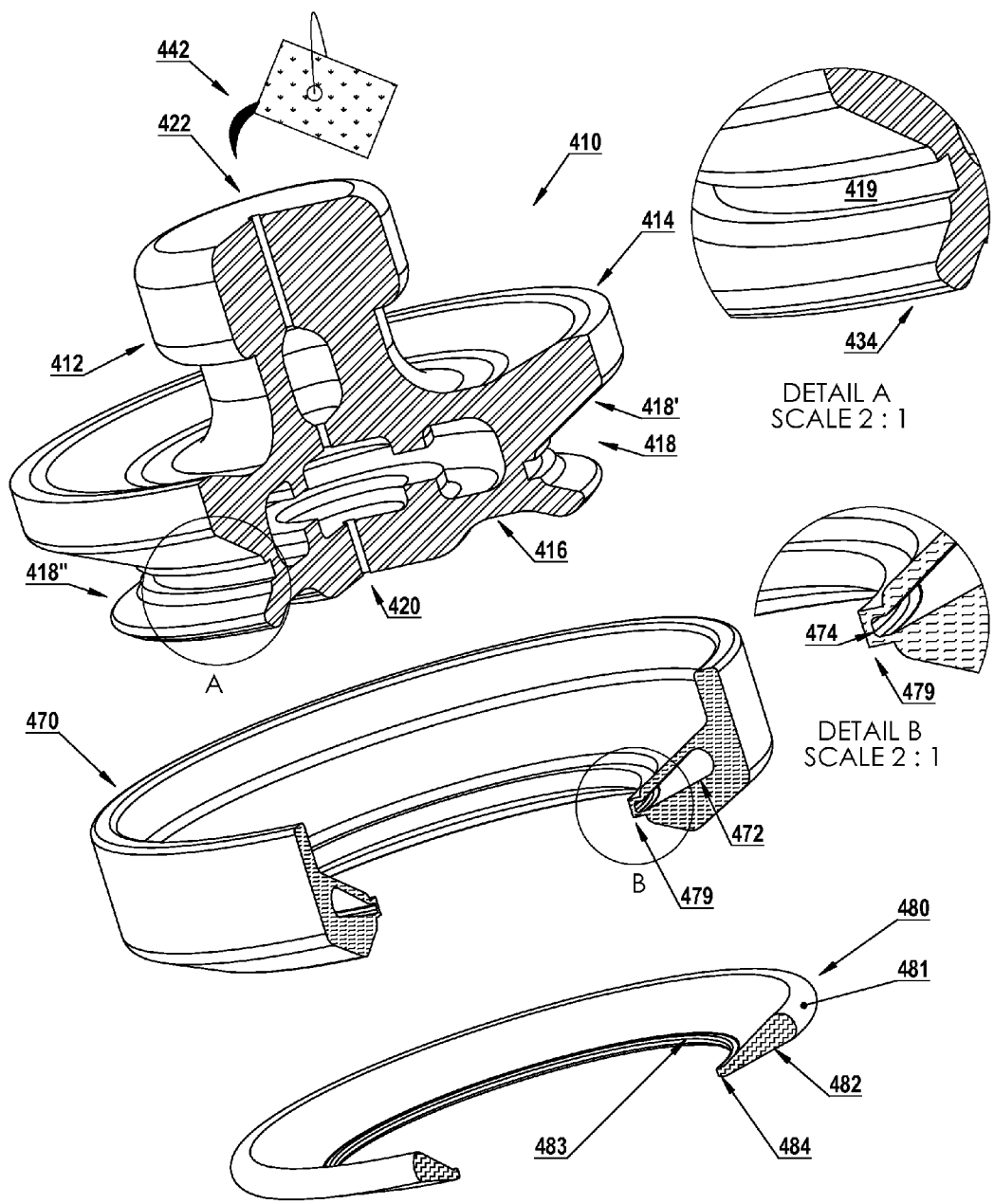
FIG. 13 includes more-detailed longitudinal sections of a schematic 3-dimensional exploded view analogous-in-part to that of the alternate tunable check valve assembly embodiment of FIG. 12. Detail breakout views include the peripheral seal's medial flange and the medial flange's corresponding flange channel. An instantaneous schematic view of a peripheral fluid tuning medium in the peripheral seal's circular tubular area is shown separately, and a central fluid tuning medium is shown schematically being added to the central circular tubular area. Note that a portion of the peripheral circular tubular area (with its fluid tuning medium) extends into (i.e., is partially surrounded by) the peripheral seal's medial flange. The central and peripheral circular tubular areas, with their respective fluid tuning media, constitute a plurality of tunable vibration dampers in the form of a tunable radial array.

FIGS. 12, 13, 14A and 14B illustrate schematic 3-dimensional longitudinally-sectioned views of components and assemblies related to alternate tunable check valve assembly embodiment 442/410/470/480 (see, e.g., the exploded view of FIG. 13). Alternate tunable check valve assembly embodiment 442/410/470/480, in turn, is shown incorporated in tunable check valve embodiment 499 (see FIG. 14B).

FIG. 12 illustrates two schematic 3-dimensional longitudinally-sectioned views of an alternate tunable check valve assembly embodiment comprising a plurality of radially-spaced vibration dampers disposed in a valve body 410 having a resilient peripheral seal 470. Each of two radially-spaced vibration dampers comprises a circular tubular area (i.e., central circular tubular area 462 as seen in FIG. 12, and peripheral circular tubular area 472/474 as seen in FIG. 13). Note that peripheral circular tubular area 472/474 is so designated because it comprises a lateral circular tubular portion 472 and a medial circular tubular portion 474 (see FIG. 13). And further note that at least one of the radially-spaced vibration dampers is tunable via a fluid tuning medium in a tubular area (see, e.g., in FIG. 12 that a central fluid tuning medium 442 is being added to spaces including central circular tubular area 462). A fluid tuning medium may comprise, e.g., one or more shear-thickening materials, and the medium may further comprise nanoparticles.

FIG. 13 is a more-detailed schematic 3-dimensional longitudinally-sectioned exploded view analogous-in-part to that of the alternate tunable check valve assembly embodiment of FIG. 12. Detail breakout views include medial flange 479 of resilient peripheral seal 470, as well as the medial flange's corresponding flange channel 419. An instantaneous schematic view of peripheral fluid tuning medium 480 in the peripheral circular tubular area 472/474 is shown spaced apart in the exploded view of FIG. 13. Note that the longitudinally-sectioned (instantaneous shape) schematic illustration of peripheral fluid tuning medium 480 comprises a lateral fluid tuning medium portion 482 corresponding to lateral circular tubular portion 472. Analogously, a medial fluid tuning medium portion 484 corresponds to medial circular tubular portion 474. Hence, peripheral fluid tuning medium 480, which includes both lateral fluid tuning medium portion 482 and medial fluid tuning medium portion 484, may be referred to herein as peripheral fluid tuning medium 482/484.

A central fluid tuning medium 442 is shown schematically being added (see FIGS. 12 and 13) to spaces including central circular tubular area 462 (labeled in FIG. 12). Note in FIG. 13 that medial portion 474 of peripheral circular tubular area 472/474 (with its medial fluid tuning medium portion 484) extends into (i.e., is partially surrounded by) medial flange 479 of resilient peripheral seal 470. The central and peripheral circular tubular areas (462 and 472/474 respectively), with their respective central and peripheral fluid tuning media (442 and 482/484 respectively), constitute a first plurality of tunable vibration dampers in the form of a tunable radial array comprising two radially-spaced vibration dampers.

Figure 14A:
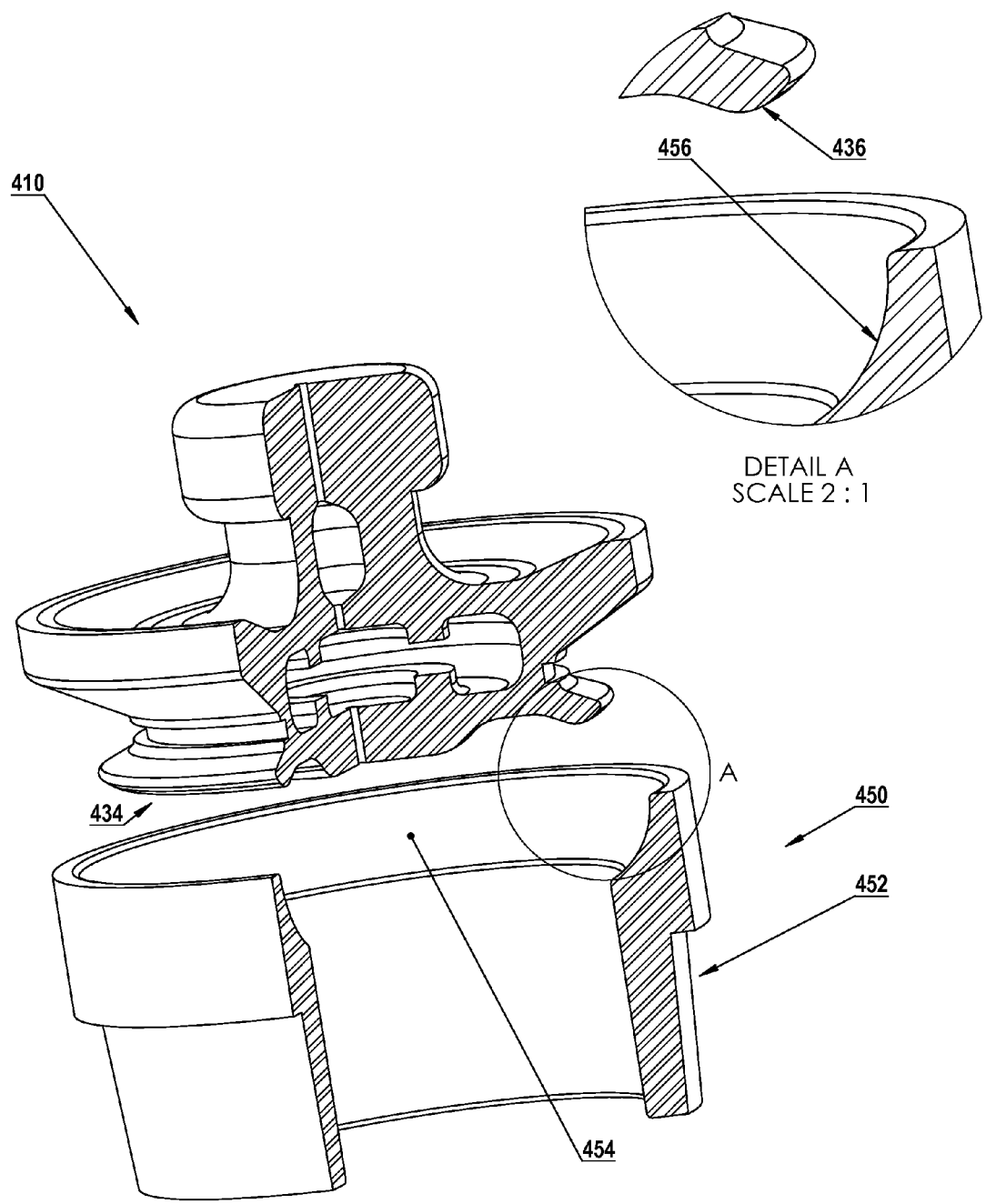
FIG. 14A illustrates longitudinal sections of a partial schematic 3-dimensional view of an alternate tunable check valve embodiment comprising the tunable valve body shown as part of the exploded assembly in FIG. 13, together with a tunable valve seat 450. Note that tapered mounting surface 452 interfaces with a fluid end housing in which tunable valve seat 450 may be mounted. A detail breakout view shows that peripheral valve seat interface 434 is convex, having correspondingly greater curvature than tunable valve seat concave mating surface 454. The concave mating surface has correspondingly less curvature than the peripheral valve seat interface to facilitate a circular rolling contact seal providing decreased contact area substantially along a circular line between the valve body's peripheral valve seat interface and the tunable valve seat's concave mating surface.

FIG. 14A illustrates a schematic 3-dimensional longitudinally-sectioned view of an alternate tunable check valve assembly embodiment comprising the valve body 410 (also shown in FIGS. 12, 13 and 14B), together with a tunable valve seat 450. Note that tapered mounting surface 452 of tunable valve seat 450 is intended for interfacing with a fluid end housing in which tunable valve seat 450 may be mounted.

Detail breakout view A of FIG. 14A shows that peripheral valve seat interface 434 is convex, having correspondingly greater curvature (as shown more clearly in section edge 436) than the concave mating surface 454 (as shown more clearly in section edge 456). The concave mating surface 454 has correspondingly less curvature than peripheral valve seat interface 434 to facilitate a circular rolling contact seal providing decreased contact area substantially along a circular line between the valve body's peripheral valve seat interface 434 and the tunable valve seat's concave mating surface 454. As noted above, the circular rolling contact seal also increases longitudinal compliance of a tunable suction or discharge valve of the invention, with the added benefit of increasing the rise and fall times of the closing energy impulse (thus widening the closing energy impulse and narrowing the associated vibration spectrum). Widening the closing energy impulse in the time domain is reflected in an increased rebound cycle time, with a corresponding decrease in rebound characteristic frequency. Rebound cycle time and rebound characteristic frequency may thus be tuned for optimal damping.

Figure 14B:
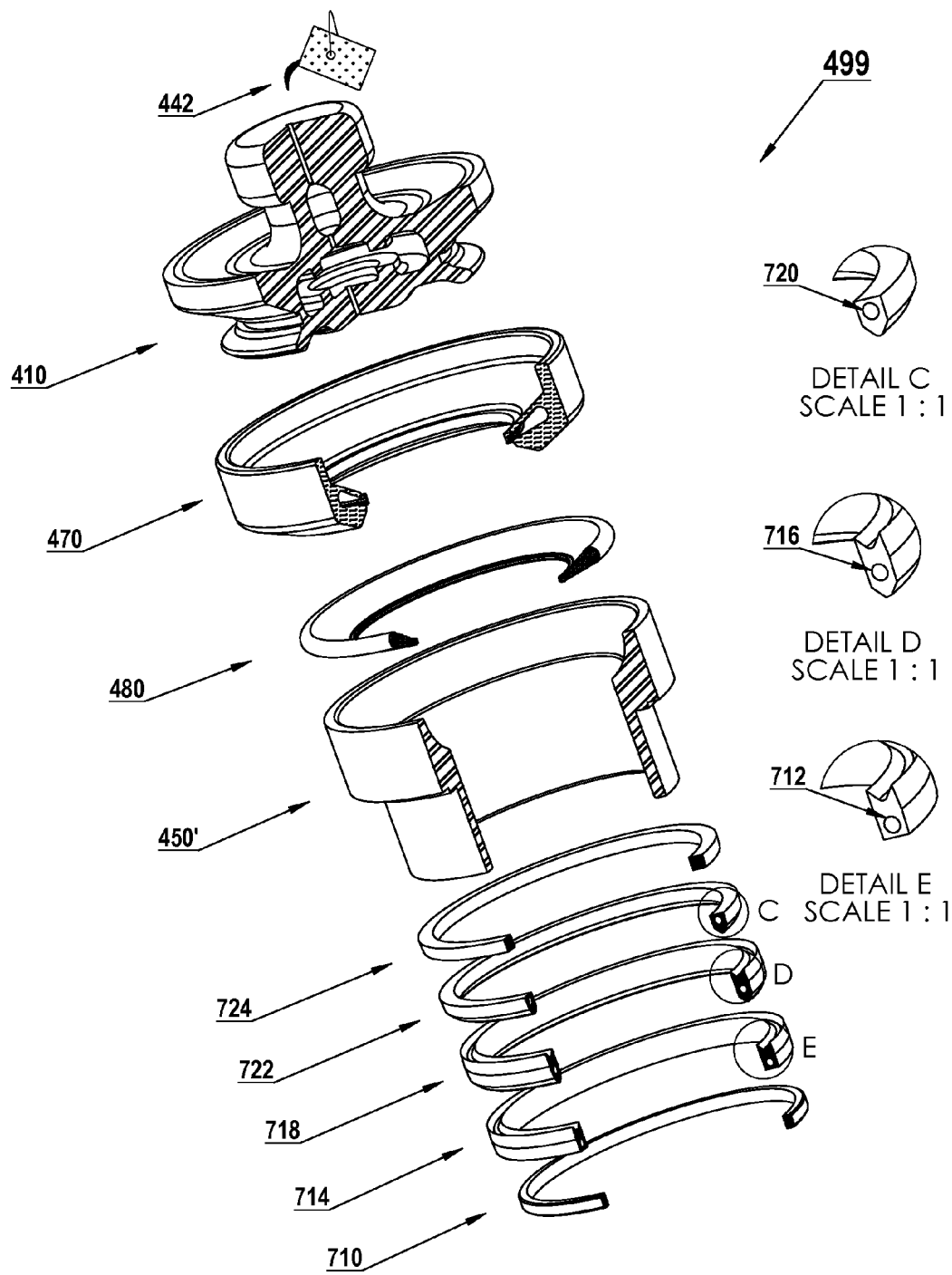
FIG. 14B illustrates longitudinal sections of a partial schematic 3-dimensional view of an alternate tunable check valve embodiment comprising the tunable check valve assembly embodiment of FIG. 13 (having a first plurality of tunable vibration dampers), together with a tunable valve seat (having a second plurality of tunable vibration dampers). The tunable valve seat of FIG. 14B comprises a plurality of tunable vibration-damping structural features comprising a concave mating surface and an adjustable lateral support assembly. The lateral support assembly interfaces with a fluid end housing in which tunable valve seat 450' may be mounted, creating tunable coupling to the fluid end housing which differs from the coupling provided via tapered mounting surface 452 (see FIG. 14A).

FIG. 14B illustrates a schematic 3-dimensional longitudinally-sectioned view of an alternate tunable check valve embodiment comprising the tunable check valve assembly embodiment of FIG. 13 (having the above-described first plurality of tunable vibration dampers), together with a tunable valve seat (the tunable valve seat having a second plurality of tunable vibration dampers). The tunable valve seat of FIG. 14B comprises a plurality of tunable vibration-damping structural features including, for example, tunable valve seat 450' with a concave mating surface 454 (surface 454 also being present in tunable valve seat 450). Tunable valve seat 450' has the prime designation due to the inclusion of an adjustable lateral support assembly 724/722/720/718/716/714/712/710, the lateral support assembly not being present in tunable valve seat 450. The lateral support assembly interfaces with a fluid end housing in which tunable valve seat 450' may be mounted, creating tunable coupling to the fluid end housing which differs from the coupling provided via tapered mounting surface 452 (see FIG. 14A).

Considering the first plurality of tunable vibration dampers in greater detail, alternate tunable check valve assembly embodiment 442/410/470/480 (see, e.g., FIG. 13) is symmetrical about a longitudinal axis and comprises a plurality of radially-spaced vibration dampers (i.e., a tunable radial array of vibration dampers). A first vibration damper (i.e., a peripheral damper) is in the resilient peripheral seal 470 with its peripheral circular tubular area 472/474 and enclosed peripheral fluid tuning medium 482/484. Peripheral circular tubular area 472/474 is responsive to cyclical longitudinal compression of the assembly (as, for example, due to increased proximal fluid pressure due to a pump pressure stroke).

Responsiveness to cyclical longitudinal compression is in-part secondary, e.g., to compression of resilient peripheral seal 470 against a tunable valve seat 450 or 450' (see, e.g., FIGS. 14A and 14B). Responsiveness to cyclical longitudinal compression is also in-part secondary, e.g., to alteration of the shape of peripheral seal groove 418 (see FIG. 13). The shape of peripheral seal groove 418 is imposed on resilient peripheral seal 470 due to relative movement of proximal and distal groove walls 418' and 418" (see FIG. 13) during longitudinal compression of the assembly against a tunable valve seat 450 or 450' (see, e.g., FIGS. 14A and 14B respectively). Note, as above herein, that the proximal and distal designations assume a suction valve (as opposed to a discharge valve) configuration.

Note also that the valve body 410 comprises peripheral valve seat interface 434 having a convex curvature (see section edge 436 in FIG. 14A). Peripheral valve seat interface 434 undergoes a substantially elastic concave flexure with slight circular rotation as the valve body 410 seats against a tunable valve seat such as 450 or 450' (see FIGS. 14A and 14B respectively), each tunable valve seat embodiment having a concave mating surface 454 with correspondingly less curvature (see, e.g., section edge 456 in FIG. 14A) than the peripheral valve seat interface (see e.g., section edge 436 in FIG. 14A). As a result, peripheral valve seat interface 434 achieves a circular rolling contact seal with concave mating surface 454 of either tunable valve seat 450 or tunable valve seat 450'. That is, the structures for achieving a circular rolling contact seal with peripheral valve seat interface 434 are identical in tunable valve seats 450 and 450'.

Further considering the first plurality of tunable vibration dampers in greater detail, a second damper (i.e., a central vibration damper) is schematically illustrated in valve body 410 (see FIG. 12). The second damper comprises surge chamber 460 and receiving area 464 in fluid communication with central circular tubular area 462 via longitudinally-opposing fluid flow restrictors 466/468. In the presence of central fluid tuning medium 442, central circular tubular area 462 and longitudinally-opposing fluid flow restrictors 466/468 are responsive to cyclical longitudinal compression of the assembly, resulting in cyclically reversible reductions of the internal volumes of central circular tubular area 462 and receiving area 464. Such reversible volume reductions in central circular tubular area 462 and receiving area 464 prompt flow of central fluid tuning medium 442 through the longitudinally-opposing fluid flow restrictors 466/468 to surge chamber 460 in association with valve closure shock and/or vibration. Such flow of central fluid tuning medium 442 reverses with each cycle of longitudinal compression.

Thus, each of the radially-spaced (i.e., peripheral and central) vibration dampers of the first plurality of tunable vibration dampers comprises a circular tubular area (e.g., peripheral circular tubular area 472/474 and central circular tubular area 462 respectively), and at least one such vibration damper is tunable to a predetermined frequency (e.g., a resonant frequency of a fluid end in which the assembly is installed). The tuning mechanisms may differ: e.g., via central fluid tuning medium 442 in central circular tubular area 462 and/or via peripheral fluid tuning medium 482/484 (shown combined as an instantaneous shape of peripheral fluid tuning medium 480) within peripheral circular tubular area 472/474. Note that central fluid tuning medium 442 is shown schematically being added in FIG. 12 via a sealable port 422 (see FIG. 13) through guide 412 in valve body 410. Control of variable fluid flow resistance and/or fluid stiffness (e.g., in the case of fluid tuning media comprising one or more shear-thickening fluids) facilitates predetermination of resonant frequency or frequencies in the central and peripheral vibration dampers.

Note also that central fluid tuning medium 442 might also or alternatively be added via sealable port 420 in (distal) base plate 416. And further note that proximal valve body portion 414 in FIG. 13 is separately identified to call attention to the possibility of fabricating base plate 416 and proximal valve body portion 414 separately and then welding them together to form valve body 410. The terms proximal and distal in this paragraph assume a suction valve configuration; in a discharge valve configuration the positions of the terms would be reversed.

In either case, tuning is a function of responsiveness of the respective vibration dampers to vibration generated by valve closure impact (see above discussion of the vibration spectrum of an impulse). For example, longitudinal force on the closed (suction) valve will tend to reduce the distance between longitudinally-opposing fluid flow restrictors 466/468, simultaneously prompting flow of central fluid tuning medium 442 from central circular tubular area 462 into receiving area 464 and, with sufficient longitudinal force, into surge chamber 460. When central fluid tuning medium 442 comprises one or more shear-thickening materials, vibration damping will be a nonlinear function of (the longitudinal-force-dependent) fluid flow resistance associated with longitudinally-opposing fluid flow restrictors 466/468.

Note that the viscosity of the central fluid tuning medium 442 may vary with time when shear-thickening material(s) are present in the central fluid tuning medium 442, thereby introducing nonlinearity for predictably altering the center frequency and/or the Q of the central vibration damper. Analogous predetermined viscosity variation associated with changes of instantaneous shape of peripheral fluid tuning medium 480 is available for predictably altering the center frequency and/or the Q (i.e., altering the tuning) of the peripheral seal vibration damper 470/472/474/480 as the resilient peripheral seal 470 distorts under the cyclical longitudinal compressive load of valve closure.

Note also that the peripheral seal vibration damper 470/472/474/480 comprises a medial flange 479 sized to fit within flange channel 419 of valve body 410. See detail breakout view A of FIG. 13 showing flange channel 419 and a peripheral valve seat interface 434 for sealing against concave mating surface 454 (see FIG. 14A). See also detail breakout view B of FIG. 13 showing medial flange 479 of resilient peripheral seal 470, medial flange 479 partially surrounding medial portion 474 of peripheral circular tubular area 472/474 within resilient peripheral seal 470. Those skilled in the art know that conventional peripheral valve body seals (analogous-in-part to resilient peripheral seal 470) tend to rotate within their retaining groove as a conventional valve body mates with a conventional valve seat. Considered as a whole, the peripheral seal vibration damper illustrated herein that comprises peripheral seal vibration damper 470/472/474/480 shows that such rotation will be resisted by the combined action of medial flange 479 within flange channel 419, together with rotation resistance inherent in the wedge-shape (seen in longitudinal cross-section as in FIG. 13) of peripheral circular tubular area 472/474 with its peripheral fluid tuning medium 480.

Facilitating such combined action, the medial portion 474 of peripheral circular tubular area 472/474 (portion 474 being partially surrounded by flange channel 419) will tend to stiffen medial flange 479 in a nonlinear manner. The stiffening of medial flange 479 is due in part to the presence of shear-thickening material in peripheral fluid tuning medium 480 (and particularly the medial fluid tuning medium portion 484 thereof) in peripheral circular tubular area 472/474. Thus, a schematically illustrated example (see FIG. 13) of peripheral circular tubular area 472/474 is shown as containing peripheral fluid tuning medium 480 (peripheral fluid tuning medium portions 482/484 being shown as having the instantaneous shape schematically illustrated in FIGS. 13 and 14B).

Combined action resisting rotation of peripheral seal vibration damper 470/472/474/480 is also facilitated by the wedge-shape (as shown schematically in longitudinal cross-section in FIG. 13) of the instantaneous representation of peripheral fluid tuning medium 480 within peripheral circular tubular area 472/474. The wedge-shape has a relatively thicker portion adjacent to lateral boundary 481 and a relatively thinner portion adjacent to medial boundary 483. As shown in FIG. 13, the wedge-shape of the instantaneous representation of peripheral fluid tuning medium 480 tapers monotonically in thickness from the relatively thicker portion adjacent to lateral boundary 481 to the relatively thinner portion adjacent to medial boundary 483.

Rotation of a peripheral seal vibration damper 470/472/474/480 as a whole would then necessarily require rotation of the instantaneous shape of peripheral fluid tuning medium 480, with the thicker lateral portion translating proximally and medially (relative to more central portions of the valve body and seal assembly) during closure of a suction valve and compression of resilient peripheral seal 470. Relative proximal translation of the more peripheral portion of resilient peripheral seal 470 occurs during valve closure for two reasons. The first reason (1) is: because the seal strikes the tunable valve seat first, causing the more peripheral seal portion to be distorted by the tunable valve seat contact, the peripheral seal portion being relatively free to move in relation to more central portions of the valve body and seal assembly due to the resilient character of the seal itself. The second reason (2) is: because of the elastic valve body concave flexure, with slight circular rotation, that accompanies valve closure (as described herein).

Note that slight circular rotation includes slight translation proximally and medially of the thicker lateral portion of the peripheral fluid tuning medium 480. And medially directed force exerted on the peripheral seal by the tunable valve seat adds to the tendency of the thicker portion of the wedge-shaped peripheral fluid tuning medium 480 to rotate medially. But this medial movement would require compression of the relatively thicker lateral portion of instantaneous shape of peripheral fluid tuning medium 480. Such thicker-portion compression of the peripheral fluid tuning medium 480 would be resisted nonlinearly, and relatively strongly, with consequent energy dissipation as heat in the shear-thickening material(s) within the fluid tuning medium. Thus, rotation resistance in peripheral seal vibration damper 470/472/474/480 as a whole contributes to dissipation of closing impulse energy. And such energy dissipation, in turn, contributes to vibration damping.

Further vibration damping in the illustrated alternate tunable check valve embodiment takes place in the second plurality of tunable vibration dampers. To support description of the damping in greater detail, alternate tunable check valve assembly embodiment 442/410/470/480 is shown in FIG. 14B combined with tunable valve seat lateral support assembly 450'/724/722/720/718/716/714/712/710. The combination is analogous-in-part to that schematically illustrated in FIG. 11. Formation of a circular rolling contact seal between the tunable valve seat's concave mating surface 454 and the correspondingly greater curvature of peripheral valve seat interface 434 is described above. The lateral support assembly comprises first and second adjustable end spacers (710 and 724 respectively) in combination with a plurality of tunable circular viscoelastic support elements (714, 718 and 722). Each support element comprises a support circular tubular area (712, 716 and 720 respectively). At least one such tubular area being substantially filled with at least one shear-thickening material analogous to material 80 (see, e.g., FIG. 5). Each shear-thickening material is chosen to achieve at least one predetermined assembly resonant damping frequency.

What is claimed is:

1. A tunable check valve in a fluid end for high pressure pumping, said fluid end having at least one fluid-end resonant frequency;
    wherein said tunable check valve is symmetrical about a longitudinal axis and comprises a tunable check valve assembly and a tunable valve seat;
    wherein said tunable check valve assembly comprises a valve body having a peripheral valve seat interface, and further comprises a resilient seal in a peripheral groove, said tunable check valve assembly having a first plurality of tunable vibration dampers;
    wherein said tunable valve seat comprises a concave mating surface spaced longitudinally apart from a lateral support assembly, said tunable valve seat having a second plurality of tunable vibration dampers;
    wherein said first plurality of tunable vibration dampers comprises a circular tubular area in said resilient seal, and further comprises a central longitudinally-opposing fluid flow restrictor in fluid communication with a circular tubular area;
    wherein said second plurality of tunable vibration dampers comprises a plurality of circular viscoelastic support elements longitudinally spaced along said lateral support assembly, each said circular viscoelastic support element comprising a circular tubular area; and
    wherein said peripheral valve seat interface has a convex curvature with correspondingly greater curvature than said concave mating surface for achieving a circular rolling contact seal between said tunable check valve assembly and said tunable valve seat, said circular rolling contact seal having a rebound characteristic frequency similar to at least one said fluid-end resonant frequency.

2. The tunable check valve of claim 1 wherein each said circular tubular area contains at least one shear-thickening fluid.

3. The tunable check valve of claim 2 wherein said central longitudinally-opposing fluid flow restrictor is responsive to cyclical longitudinal compression of said tunable check valve assembly.

4. The tunable check valve of claim 3 wherein said shear-thickening fluid comprises nanoparticles.

5. The tunable check valve of claim 1 wherein said circular tubular area in said resilient seal has a wedge-shape in longitudinal cross-section.

6. The tunable check valve of claim 5 wherein said wedge-shape is thicker laterally than medially.

7. The tunable check valve of claim 5 wherein said wedge-shape tapers monotonically from lateral to medial.

8. A tunable check valve in a fluid end for high pressure pumping, said fluid end having at least one fluid-end resonant frequency;
    wherein said tunable check valve is symmetrical about a longitudinal axis and comprises a tunable check valve assembly and a tunable valve seat;
    wherein said tunable check valve assembly comprises a valve body having a resilient seal in a peripheral seal retention groove, said resilient seal comprising a first circular tubular area, and said first circular tubular area having a wedge-shape in longitudinal cross-section;
    wherein said first circular tubular area has a relatively medial boundary and a relatively lateral boundary;
    wherein said wedge-shape tapers monotonically in thickness from a relatively thicker portion adjacent to said relatively lateral boundary to a relatively thinner portion adjacent to said relatively medial boundary;
    wherein said valve body comprises a peripheral valve seat interface having a convex curvature and said tunable valve seat has a concave mating surface with correspondingly less curvature than said peripheral valve seat interface for achieving a circular rolling contact seal with said valve seat interface; and
    wherein said valve body closes on said tunable valve seat with a rebound characteristic frequency lower than at least one said fluid-end resonant frequency.

9. The tunable check valve of claim 8 wherein said first circular tubular area contains at least one shear-thickening fluid.

10. The tunable check valve of claim 9 wherein said first circular tubular area is responsive to cyclical longitudinal compression of said tunable check valve assembly.

11. The tunable check valve of claim 10 wherein said shear-thickening fluid comprises nanoparticles.

12. The tunable check valve of claim 8 wherein said valve body additionally comprises a longitudinally-opposing fluid flow restrictor in fluid communication with a second circular tubular area, said fluid flow restrictor being responsive to cyclical longitudinal compression of said tunable check valve assembly.

13. The tunable check valve of claim 12 wherein said second circular tubular area contains a fluid tuning medium for tuning said tunable check valve to a predetermined frequency.

14. The check valve of claim 13 wherein said fluid tuning medium comprises a shear-thickening fluid.

15. The check valve of claim 13 wherein said predetermined frequency is similar to at least one said fluid-end resonant frequency.

16. A tunable check valve in a fluid end for high pressure pumping, said fluid end having at least one fluid-end resonant frequency;
    wherein said tunable check valve is symmetrical about a longitudinal axis and comprises a tunable check valve assembly and a tunable valve seat, said tunable valve seat comprising a lateral support assembly spaced longitudinally apart from a mating surface with concave curvature;
    wherein said tunable check valve assembly comprises a valve body having a peripheral valve seat interface and further having a resilient seal in a peripheral groove, said resilient seal comprising a first circular tubular area;
    wherein said peripheral valve seat interface has convex curvature, said convex curvature being correspondingly greater than said mating surface concave curvature for achieving a circular rolling contact seal between said tunable check valve assembly and said tunable valve seat;
    wherein said circular rolling contact seal between said tunable check valve assembly and said tunable valve seat has a rebound characteristic frequency greater than at least one said fluid-end resonant frequency;
    wherein said valve body comprises a second circular tubular area in fluid communication with a longitudinally-opposing fluid flow restrictor, said fluid flow restrictor being responsive to cyclical longitudinal compression of said valve body;
    wherein said lateral support assembly comprises a plurality of circular viscoelastic support elements, each element comprising a support circumferential tubular area; and
    wherein said first and second circular tubular areas and each said support circumferential tubular area contains at least one fluid tuning medium.

17. The tunable check valve of claim 16 wherein said fluid tuning medium comprises at least one shear-thickening material.

18. The tunable check valve of claim 17 wherein said shear thickening material additionally comprises nanoparticles.

19. The tunable check valve of claim 16 wherein said first circular tubular area is wedge-shaped in longitudinal cross-section, being relatively longitudinally thicker laterally, and transitioning to relatively longitudinally thinner medially.

20. The tunable check valve of claim 19 wherein said first circular tubular area transitions monotonically from relatively longitudinally thicker laterally to relatively longitudinally thinner medially.

* * * * *